United States Patent
Connelly et al.

(10) Patent No.: US 10,427,776 B2
(45) Date of Patent: Oct. 1, 2019

(54) SLIDING JOINT KITS, SYSTEMS CONTAINING THE SAME, AND RELATED METHODS

(71) Applicant: The Boeing Company, Chicago, IL (US)

(72) Inventors: Thomas Joseph Connelly, Bellevue, WA (US); Linda M. Li, Bothell, WA (US); William Clifton Cromer, Seattle, WA (US)

(73) Assignee: The Boeing Company, Chicago, IL (US)

( * ) Notice: Subject to any disclaimer, the term of this patent is extended or adjusted under 35 U.S.C. 154(b) by 266 days.

(21) Appl. No.: 15/220,820

(22) Filed: Jul. 27, 2016

(65) Prior Publication Data

US 2018/0029688 A1    Feb. 1, 2018

(51) Int. Cl.
| | |
|---|---|
| *F16B 5/02* | (2006.01) |
| *B64C 1/40* | (2006.01) |
| *B64D 29/02* | (2006.01) |
| *B64D 33/04* | (2006.01) |
| *F16B 5/04* | (2006.01) |

(52) U.S. Cl.
CPC ............... *B64C 1/40* (2013.01); *B64D 29/02* (2013.01); *B64D 33/04* (2013.01); *F16B 5/0241* (2013.01); *F16B 5/0225* (2013.01); *F16B 5/04* (2013.01)

(58) Field of Classification Search
CPC .. B64C 1/40; F16B 5/0241; F16B 5/04; F16B 43/002; F16B 19/06; Y10T 403/75
USPC ...... 403/408.1; 411/504, 506, 534; 24/703.1
See application file for complete search history.

(56) References Cited

U.S. PATENT DOCUMENTS

| | | | | |
|---|---|---|---|---|
| 1,986,981 A | * | 1/1935 | Ross ..................... | E04B 1/2403 403/404 |
| 4,289,060 A | * | 9/1981 | Emmett ................ | F16B 5/0258 411/34 |

(Continued)

FOREIGN PATENT DOCUMENTS

EP        1598562        11/2005

OTHER PUBLICATIONS

European Patent Office, Extended European Search Report for related European Application No. 17175333, dated Dec. 8, 2017.

(Continued)

*Primary Examiner* — Amber R Anderson
*Assistant Examiner* — Nahid Amiri
(74) *Attorney, Agent, or Firm* — DASCENZO Intellectual Property Law, P.C.

(57) ABSTRACT

Presently disclosed sliding joint kits, sliding joints, and systems including the same may be configured to join a first panel and a second panel together such that at least a portion of the first panel and second panel are in sliding contact with one another, thereby allowing movement of one panel with respect to the other. In this manner, panels may be joined together while still allowing thermal expansion and resulting movement of one panel relative to the other. For example, presently disclosed sliding joints may be used to join panels of an aircraft heat shield together, which may result in reduced buckling and/or reduced joint stress of the panels of the heat shield. Related methods of assembling a sliding joint kit to join a first panel and a second panel are also disclosed.

21 Claims, 6 Drawing Sheets

(56) References Cited

U.S. PATENT DOCUMENTS

| | | | | |
|---|---|---|---|---|
| 4,523,883 | A | * | 6/1985 | Peterson ............. H01L 23/4006 174/562 |
| 5,369,952 | A | * | 12/1994 | Walters ................... F02C 7/222 188/381 |
| 6,260,197 | B1 | * | 7/2001 | Hoogewind ............ A61F 9/061 2/8.3 |
| 6,523,834 | B2 | | 2/2003 | Philipson ............... C09K 3/1021 277/523 |
| 6,561,312 | B2 | * | 5/2003 | Stanienda ............. F16B 5/0241 180/300 |
| 6,659,702 | B2 | * | 12/2003 | Kitayama ............. F16B 43/001 403/408.1 |
| 6,862,777 | B2 | * | 3/2005 | LaPointe ............. A47C 1/0345 16/221 |
| 6,899,488 | B2 | * | 5/2005 | Geringer ................ B62D 55/00 296/30 |
| 7,101,110 | B2 | * | 9/2006 | LaPointe ................. F16C 11/04 297/68 |
| 7,121,758 | B2 | * | 10/2006 | McMillan ............. F01D 21/045 403/408.1 |
| 7,581,301 | B2 | * | 9/2009 | Arbona ................. B62D 29/048 29/525.02 |
| 8,844,868 | B2 | * | 9/2014 | Kolax ..................... B64C 1/064 244/119 |
| 2003/0201366 | A1 | | 10/2003 | Connelly et al. |
| 2005/0053419 | A1 | * | 3/2005 | McMillan ............. F01D 21/045 403/2 |
| 2008/0164109 | A1 | * | 7/2008 | Guether .................. F16D 65/12 188/218 XL |
| 2008/0178465 | A1 | | 7/2008 | Schiavo et al. |
| 2008/0304906 | A1 | * | 12/2008 | Maj ....................... F16B 5/0241 403/408.1 |
| 2010/0051743 | A1 | | 3/2010 | Dumont et al. |
| 2011/0121152 | A1 | * | 5/2011 | Ghatikar ................... E04B 9/18 248/309.1 |
| 2013/0105622 | A1 | | 5/2013 | Journade |
| 2013/0145716 | A1 | * | 6/2013 | Olson ................. E04F 13/0837 52/582.1 |
| 2013/0223982 | A1 | * | 8/2013 | Durocher .................. F16B 5/04 415/12 |
| 2013/0320135 | A1 | | 12/2013 | Raison et al. |
| 2014/0079509 | A1 | * | 3/2014 | Chalverat ................. F16B 5/02 411/366.1 |
| 2016/0001888 | A1 | | 1/2016 | Shephard et al. |
| 2016/0135550 | A1 | * | 5/2016 | Drage ................ A44B 17/0076 24/453 |
| 2017/0074302 | A1 | * | 3/2017 | Gordon ..................... B23P 6/00 |
| 2017/0259906 | A1 | * | 9/2017 | Connelly .................. B64C 3/36 |

OTHER PUBLICATIONS

Printout of screenshot of product webpage, Chrome Plated Rear Sprocket Hardware Kits, from colonymachine.com, May 9, 2016.

Printout of screenshot of product webpage, F Series / Eyelet, G1 Series / Plain Washer, and G2 Series / Rolled Rim Washer, from jac-kie.com, May 9, 2016.

Printout of screenshot of product webpage, Phillips Oval Head Screw with Countersunk Washer and Oversized Shank, from lawson.com, May 9, 2016.

* cited by examiner

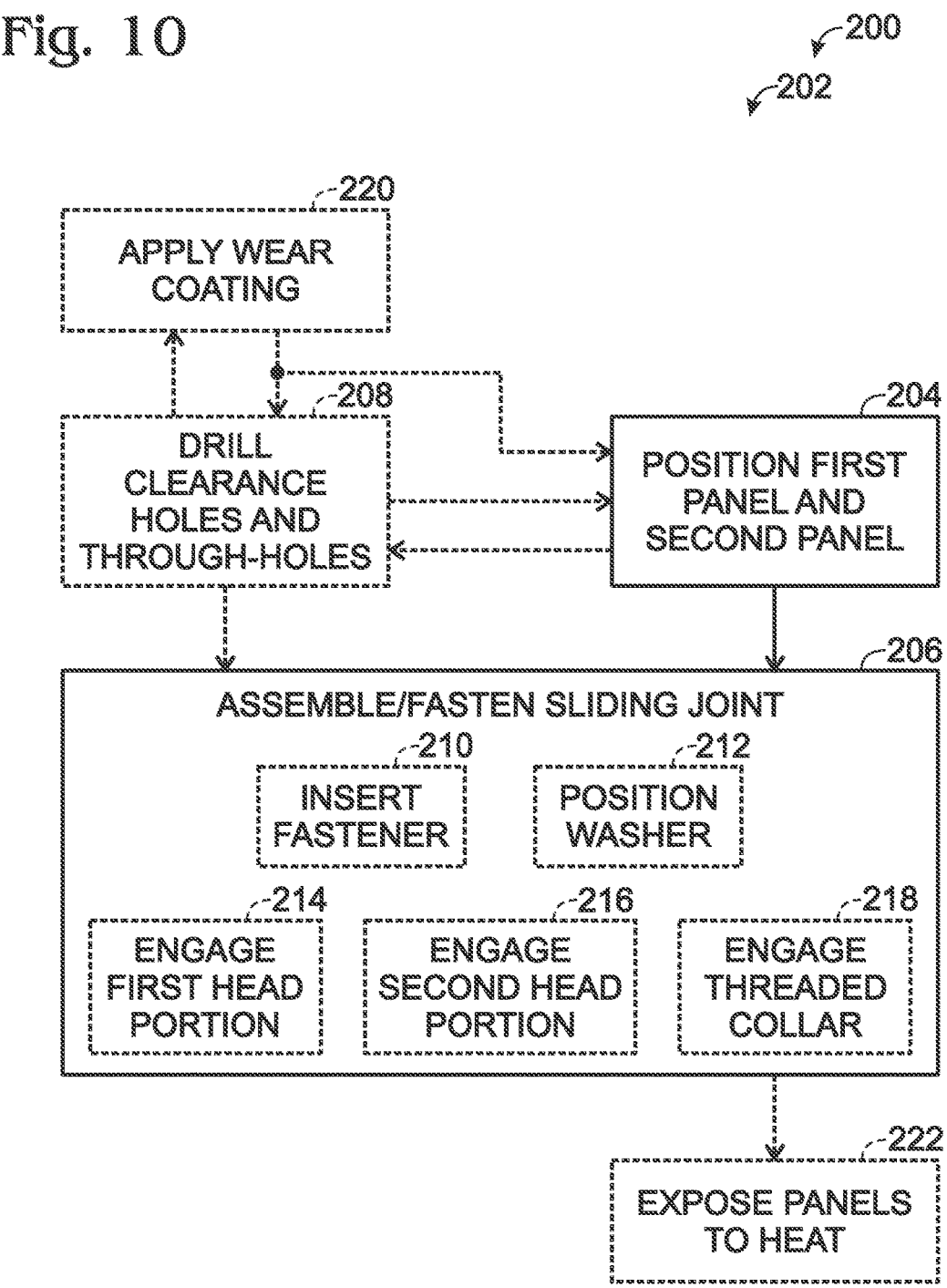

SLIDING JOINT KITS, SYSTEMS CONTAINING THE SAME, AND RELATED METHODS

FIELD

The present disclosure relates to sliding joint kits, systems containing the same, and related methods.

BACKGROUND

Aircraft and other vehicles often include heat shields positioned near engines to shield other components of the aircraft from heat from the engines. Said heat shields typically are constructed from one or more panels (e.g., composite, metallic, and/or ceramic panels) that are joined together. Exhaust from the engine heats up these heat shields, which in turn causes thermal expansion of the panels of the heat shield. When panels that are joined together thermally expand at different rates (e.g., due to contoured shapes of the panels, locations of the panels relative to the engines, etc.), undesirable buckling may be observed in one or more of the panels. For example, typical heat shields may include a first panel riveted to a second panel. When the second panel thermally expands relative to the first panel, buckling results, as the panels are typically riveted together such that the panels are constrained on all sides. Furthermore, such buckling may cause stress at the joints, may decrease fatigue life of the heat shield, and/or may potentially cause crack initiation along the panels of the heat shield.

SUMMARY

Presently disclosed sliding joint kits may be used to slidably join one or more panels together to form a sliding joint, so as to allow different rates of thermal expansion between the panels. For example, said sliding joints may be configured to allow a second panel to thermally expand with respect to a first panel, such that the second panel slides with respect to the first panel as it expands. Such sliding joints and systems including the same may thereby alleviate buckling, prevent or alleviate stress at fastened joints, and/or improve the fatigue life of joined panels, such as used in heat shields for aircraft. At the same time, presently disclosed sliding joints may be configured to preserve contact between a portion of the panels at the joint (sometimes referred to as "clamp-up"), to prevent hot air ingression into the interior of the heat shield cavity, and/or to prevent vibration of the panels of the heat shield.

One example of a sliding joint kit for joining a first panel to a second panel according to the present disclosure includes a washer having a central hole and a lower flange surface, and a fastener extending through the central hole of the washer. The sliding joint kit is configured to be assembled to join the first panel and the second panel such that the fastener and the washer are fixed with respect to the second panel, and such that the washer and the second panel are in sliding contact with the first panel. For example, the washer is generally arranged with respect to the first panel such that the lower flange surface faces a first outer surface of the first panel, with the washer being configured to slide with respect to the first panel. The first panel may include a first inner surface opposite the first outer surface, with a second inner surface of the second panel being in sliding contact with the first inner surface of the first panel when the sliding joint kit is assembled. The fastener includes a first head portion configured to engage the second panel, thereby fixing the fastener and the washer with respect to the second panel. As assembled, the sliding joint is configured to accommodate different coefficients of thermal expansion between the second panel and the first panel.

One example of a related method of joining a first panel to a second panel according to the present disclosure includes positioning a first portion of a first inner surface of the first panel such that it faces and is adjacent to a first portion of a second inner surface of the second panel. The first portion of the first inner surface includes a plurality of clearance holes formed therethrough, and the first portion of the second inner surface comprises a plurality of through-holes therethrough. Generally, the second panel comprises a respective through-hole for each respective clearance hole of the first panel, and the first panel and the second panel are aligned with respect to one another such that each respective clearance hole forms a respective clearance hole-through-hole pair with a respective through-hole. Said methods also include fastening a sliding joint at a respective clearance hole-through-hole pair (e.g., assembling a sliding joint kit), thereby joining the first panel to the second panel.

BRIEF DESCRIPTION OF THE DRAWINGS

FIG. 10 is a flowchart schematically representing methods according to the present disclosure.

DESCRIPTION

Figure 1:
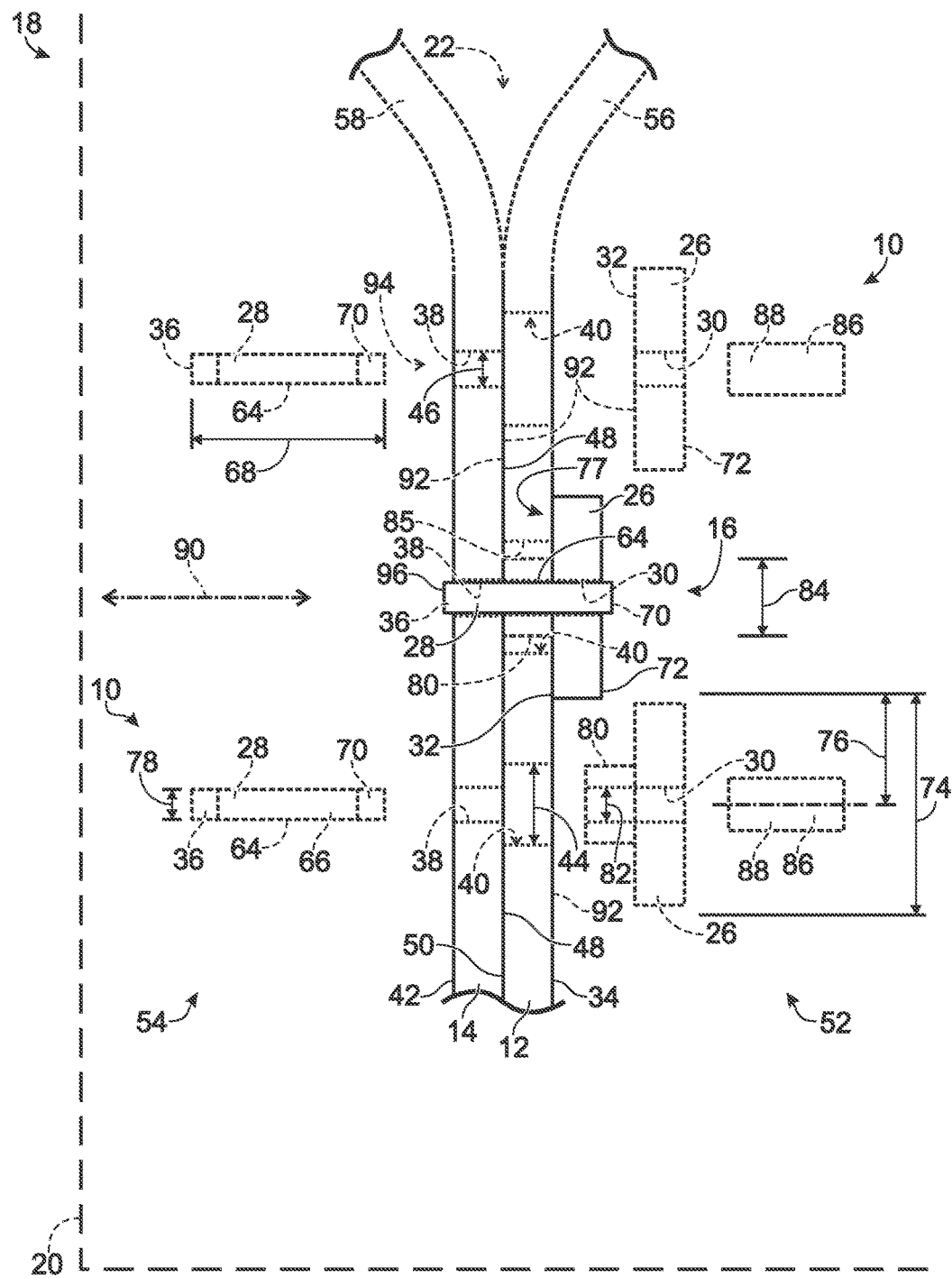
FIG. 1 is a schematic view of illustrative, non-exclusive examples of sliding joint kits for joining panels and systems including the same, according to the present disclosure.

As shown schematically in FIG. 1, presently disclosed sliding joint kits 10 may be used to join one or more panels together (e.g., a first panel 12 and a second panel 14), so as to allow different rates of thermal expansion between the panels 12, 14. For example, said sliding joint kits 10 may be configured to be assembled to join first panel 12 and second panel 14, thereby forming a sliding joint 16 and allowing second panel 14 to thermally expand with respect to first panel 12, such that second panel 14 slides with respect to first panel 12 as it expands. Such sliding joints 16 and systems 18 including the same may thereby alleviate buckling, prevent or alleviate stress at fastened joints, and/or improve the fatigue life of joined panels (e.g., first panel 12 and second panel 14), such as used in heat shields for an aircraft 20. At the same time, presently disclosed sliding joints 16 may be configured to preserve contact between a portion of the panels 12, 14 (this contact is sometimes referred to as "clamp-up"), to prevent hot air ingression into an interior cavity 22 of a heat shield 24 (see FIG. 2), and/or to prevent vibration of the panels 12, 14. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

The schematic illustration of FIG. 1 shows a plurality of sliding joint kits 10 (in an exploded view configuration) that may be used to slidably join first panel 12 to second panel 14 (e.g., join first panel 12 and second panel 14 such that the panels may slide with respect to one another, such as due to thermal expansion of one of the panels with respect to the other). Sliding joint kit 10 generally includes a washer 26 and a fastener 28 that extends through a central hole 30 of washer 26 when sliding joint kit 10 is assembled, thereby forming sliding joint 16. A lower flange surface 32 is configured to face a first outer surface 34 of first panel 12 when the joint is assembled, and to slide with respect to first panel 12, such as along first outer surface 34. For example, when sliding joint kit 10 is assembled, thereby joining first panel 12 to second panel 14, lower flange surface 32 of washer 26 may be in sliding contact with (e.g., engage) first outer surface 34 and translate within the plane defined by first outer surface 34, with respect to first outer surface 34. In some examples, lower flange surface 32 may contact first outer surface 34 of first panel 12 directly. In other examples, one or more coatings or other materials may be present between lower flange surface 32 and first outer surface 34, while still creating a sliding relationship between these two surfaces. Similarly, a second inner surface 48 of second panel 14 may be in sliding contact with a first inner surface 50 of first panel 12, thereby facilitating sliding of second panel 14 with respect to first panel 12. When sliding joint kit 10 is so assembled, first panel 12 and second panel 14 may be arranged with respect to one another such that first outer surface 34 and a second outer surface 42 of second panel 14 (second outer surface 42 being opposite second inner surface 48) face away from one another. As used herein, surfaces or structures are in "contact" or "engaged" with one another when one exerts a force on another, not necessarily requiring direct contact between the two (e.g., intervening structures and/or coatings may be present).

Fastener 28 generally includes a first head portion 36 that is configured to engage second panel 14. For example, when sliding joint kit 10 is assembled, fastener 28 may be positioned through a through-hole 38 in second panel 14, through a clearance hole 40 in first panel 12, and through central hole 30 of washer 26. As used herein, the term "hole" refers to an aperture extending through at least a portion of an object or material. For example, central hole 30 is an aperture extending through washer 26, from lower flange surface 32 to an upper flange surface 72 opposite lower flange surface 32, through-hole 38 is an aperture extending through second panel 14, from second outer surface 42 to second inner surface 48, and clearance hole 40 is an aperture extending through first panel 12, from first inner surface 50 to first outer surface 34. First head portion 36 may be flush with second outer surface 42 of second panel 14 in some examples, such as by being chamfered to engage a countersunk through-hole 38. In other examples, first head portion 36 need not be flush with second outer surface 42, but otherwise is engaged with second outer surface 42, thereby preventing fastener 28 from being pulled all the way through through-hole 38 of second panel 14.

A clearance diameter 44 of clearance hole 40 is greater than a diameter 46 of through-hole 38. Generally, through-hole 38 may be sized to accommodate fastener 28 with little to no translation possible within through-hole 38. Clearance hole 40, however, is significantly larger, thereby allowing translation of fastener 28 within clearance hole 40, with respect to clearance hole 40. Thus, when first panel 12 and second panel 14 are joined via sliding joint kit 10, fastener 28 and washer 26 are substantially fixed with respect to second panel 14 (e.g., when second panel 14 moves, fastener 28 and washer 26 move with it, having been secured via through-hole 38), but not with respect to first panel 12. Accordingly, such sliding joints 16 may be configured to accommodate thermal expansion of one panel (e.g., second panel 14) with respect to another (e.g., first panel 12), as second panel 14 may slide with respect to first panel 12, and fastener 28 and washer 26 may slide with respect to first panel 12, as second panel 14 thermally expands and moves with respect to first panel 12 as well. In this manner, first panel 12 and second panel 14 may have different respective coefficients of thermal expansion, but being coupled together by sliding joints 16 according to the present disclosure allows the panels to remain coupled together but still expand different amounts without resulting in buckling of the panels (and/or reducing buckling and/or other disadvantages present in prior art rigid joints). In some examples, systems 18 are configured such that thermal expansion of second panel 14 relative to first panel 12 does not cause shear loading on first panel 12. For example, clearance hole 40 may be sized to accommodate anticipated movement of or displacement of second panel 14 with respect to first panel 12 (e.g., due to thermal expansion of second panel 14 relative to first panel 12) such that movement of second panel 14 does not cause sliding joint 16 to apply a shear load to first panel 12. As used herein, "movement" includes thermal expansion, independent of or along with other movement, such as translation, rotation, and etc.

Figure 2:
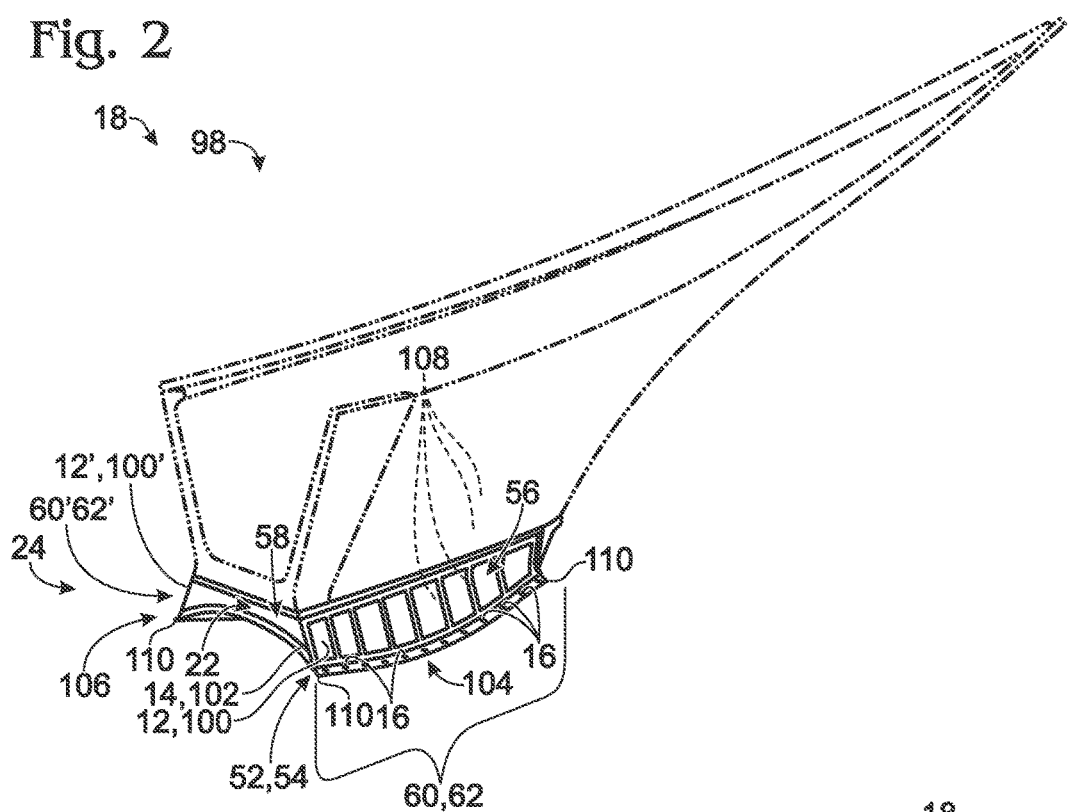
FIG. 2 is a perspective view of an example of a heat shield for an aircraft, including a plurality of sliding joints according to the present disclosure.

In some examples, sliding joints 16 are configured to maintain sliding contact between just a portion of the respective panels. For example, as best seen in FIG. 2, a first portion 52 of first panel 12 and a first portion 54 of second panel 14 may be in sliding contact with each other when joined by sliding joints 16, while a second portion 56 of first panel 12 and a second portion 58 of second panel 14 may be spaced apart from one another, such as to form interior cavity 22 between the panels. In some examples, said first portion 52 of first panel 12 may be located within and along a first edge region 60 of first panel 12. Similarly, said first portion 54 of second panel 14 may be located within and along a first edge region 62 of second panel 14. In some systems, first edge region 60 of first panel 12 and first edge region 62 of second panel 14 are substantially coincident with one another when system 18 is in a nominal temperature condition (e.g., at room temperature, at an atmospheric temperature, and/or when other components of or adjacent system 18 are at a sufficiently low temperature). When system 18 is at an elevated temperature condition having a temperature sufficient to cause thermal expansion of second panel 14 relative to first panel 12, first edge region 60 of first panel 12 is non-coincident with first edge region 62 of second panel 14 in some examples. In other words, when second panel 14 moves (e.g., thermally expands, or otherwise moves as permitted by sliding joints 16) relative to first panel 12, second panel 14 may move such that first edge region 62 of second panel 14 moves beyond, or past, first edge region 60 of first panel 12, such that the edge regions are no longer flush or coincident in some examples. As systems 18 return to a nominal temperature condition, second panel 14 contracts relative to first panel 12, such that the edge regions may again be substantially coincident, in some examples.

Returning to FIG. 1, fastener 28 may be any suitable fastener. In some examples, fastener 28 may be a rivet, a countersunk rivet, a double flush countersunk rivet, a bolt, a pin, a screw, a nail, and/or any other suitable fastener. Fastener 28 may include a shaft 64 extending from first head portion 36. Shaft 64 may include a threaded portion 66 in some examples. In other examples, fastener 28 may be devoid of threads on shaft 64. Shaft 64 may have a shaft length 68 that is sufficient to extend at least through first panel 12, second panel 14, and washer 26. In some examples, fastener 28 includes a second head portion 70 opposite first head portion 36. For example, second head portion 70 may be configured to engage upper flange surface 72 of washer 26, upper flange surface 72 being opposite lower flange surface 32 of washer 26. For example, second head portion 70 may be flush with upper flange surface 72 when sliding joint kit 10 is assembled. In some examples, central hole 30 of washer 26 may be countersunk such that a chamfered second head portion 70 may engage such that it is flush with upper flange surface 72 of washer 26.

A flange diameter 74 of washer 26 is greater than clearance diameter 44 of clearance hole 40, such that washer 26 does not fall into or enter clearance hole 40 and at least a portion of lower flange surface 32 remains in sliding contact with first outer surface 34 of first panel 12 (e.g., washer 26 is configured to maintain an overlap portion 77 (best seen in FIG. 4) between lower flange surface 32 and first outer surface 34 of first panel 12). In some examples, flange diameter 74 may be at least two times larger than clearance diameter 44, such that a flange radius 76 of washer 26 is also greater than clearance diameter 44. Additionally or alternatively, the sum of flange radius 76 and a fastener diameter 78 of fastener 28 may be greater than clearance diameter 44.

Washer 26 may include a stem 80 extending from lower flange surface 32, and central hole 30 may also extend through stem 80. Accordingly, central hole 30 may have an inner stem diameter 82 within stem 80 that is sized to accommodate fastener 28, such as with a friction fit or press fit. When assembled, stem 80 is positioned within clearance hole 40, and fastener 28 extends through through-hole 38, clearance hole 40, stem 80, and central hole 30 of washer 26. Stem 80 may extend through clearance hole 40, all the way to second inner surface 48 of second panel 14 in some examples. In other examples, stem 80 may extend through just a portion of the depth of clearance hole 40. Stem 80 may slide (e.g., translate) within clearance hole 40, as second panel 14, fastener 28, and washer 26 move with respect to first panel 12, such as due to thermal expansion of second panel 14 relative to first panel 12. In other words, an outer stem diameter 84 of stem 80 is less than clearance diameter 44 of clearance hole 40.

Clearance diameter 44 is sized relative to fastener 28 (and/or stem 80) to allow for a predetermined amount of thermal expansion of second panel 14 relative to first panel 12, and thereby a predetermined amount of movement of fastener 28 (and/or stem 80) relative to clearance hole 40, in some examples. For example, clearance diameter 44 may be sized relative to fastener diameter 78 (and/or relative to outer stem diameter 84) such that fastener 28 (and/or stem 80) remains spaced apart from a peripheral side wall 85 of clearance hole 40 as second panel 14 expands/moves relative to first panel 12, thereby causing fastener 28 and/or stem 80 to move within clearance hole 40. Practically, in some examples, clearance diameter 44 is more than 25% greater, more than 50% greater, more than 75% greater, more than 100% greater, more than 150% greater, more than 200% greater, more than 300% greater, more than 400% greater, and/or more than 500% greater than fastener diameter 78 (and/or outer stem diameter 84). In some examples, the sum of flange radius 76 of washer 26 and outer stem diameter 84 is greater than clearance diameter 44.

Some systems 18 may include a threaded collar 86 having internal threads configured to engage threaded portion 66 of fastener 28 and may be engaged with fastener 28 adjacent washer 26. Threaded collar 86 may be configured to engage fastener 28 with a maximum predetermined preload, thereby preventing tightening sliding joint 16 to the point that sliding between first panel 12 and second panel 114 is prevented or hampered. For example, threaded collar 86 may include a wrenching element 88 that is configured to break away from threaded collar 86 at the predetermined preload. In some examples, wrenching element 88 may include a hex head used to secure threaded collar 86 onto fastener 28, but is configured to prevent too much torque from being applied to threaded collar 86 (e.g., threaded collar 86 has a maximum installation torque that is sufficiently low so as to allow sliding between at least a portion of first panel 12 and second panel 14 resulting from thermal expansion of second panel 14 relative to first panel 12). Threaded collar 86 generally may be configured to prevent movement of fastener 28 in a longitudinal direction 90 defined by the longitudinal axis of fastener 28, when secured to fastener 28. In some examples, threaded collar 86 may be substantially cylindrical. Additionally or alternatively, threaded collar 86 may have elliptical threads in some examples.

Systems 18 may include a wear coating 92 applied to, for example, second inner surface 48 of second panel 14 (e.g., first portion 54 of second inner surface 48), first inner surface 50 of first panel 12 (e.g., first portion 52 of first inner surface 50), first outer surface 34 of first panel 12, and/or lower flange surface 32 of washer 26. Generally, wear coating 92 may be present on any surface that is in sliding contact with another surface in presently disclosed systems. Wear coating 92 may be configured to prevent wear and/or reduce friction between surfaces in sliding contact with one another. In some examples, wear coating 92 may be a tungsten carbide coating. Wear coating 92 may be sprayed, deposited, adhered to, and/or otherwise applied to one or more surfaces of sliding joints 16, and generally may be applied before assembling the panels together using sliding joints 16.

Presently disclosed sliding joint kits 10 may be used to join any suitable panels together for any application, such as in aircraft, aerospace, military, recreational, and/or other vehicles. In some specific examples, sliding joint kits 10 may be used to join panels for an engine pylon fairing, for a heat shield, for a plume suppression flange for a heat shield, and/or in a jet propulsion system. For example, first panel 12 may be a first heat shield panel, such as a side panel for a heat shield, and second panel 14 may be a second heat shield panel, such as a bottom panel for a heat shield. In these examples, system 18 may be a heat shield, a heat shield plume suppressor, a component of a jet propulsion system, and/or an aircraft containing one or more of the same.

First panel 12 and second panel 14 may be arranged with respect to one another such that at least a portion of first inner surface 50 of first panel 12 faces at least a portion of second inner surface 48 of second panel 14. For example, first portion 52 of first inner surface 50 may face and be in sliding contact with first portion 54 of second inner surface 48. First panel 12 and/or second panel 14 are contoured in some examples, such as shown in FIG. 2, such that the entirety of the inner surfaces of first panel 12 and second panel 14 do not necessarily face each other. In some examples, first panel 12 and second panel 14 may be arranged such that substantially the entire first inner surface 50 of first panel 12 faces substantially the entire second inner surface 48 of second panel 14. No matter the arrangement of first panel 12 and second panel 14 with respect to one another, first inner surface 50 of first panel 12 is opposite first outer surface 34 of first panel 12, and second inner surface 48 of second panel 14 is opposite second outer surface 42 of second panel 14.

First panel 12 generally includes a plurality of clearance holes 40 formed there through, but may include just one clearance hole 40 in some examples. Clearance holes 40 extend through first panel 12, from first inner surface 50 to first outer surface 34 of first panel 12. In some examples, first panel 12 includes a plurality of clearance holes 40 arranged in one or more rows along the length of first panel 12. Additionally or alternatively, first panel 12 may include a plurality of clearance holes 40 arranged in an array or other pattern, as desired for a given application. In the example shown in FIG. 2, first panel 12 includes a row of clearance holes 40, spaced apart from one another and generally linearly arranged along the length of first panel 12, positioned within first edge region 60 of first panel 12. Generally, clearance holes 40 may be formed in first panel 12 in areas where it is desired to join first panel 12 to another panel (e.g., to second panel 14). Clearance holes 40 have a substantially constant diameter in some examples.

Similarly, second panel 14 generally includes a plurality of through-holes 38 formed there through, but may include just one through-hole 38 in some examples. Through-holes 38 extend through second panel 14, from second inner surface 48 to second outer surface 42 of second panel 14. In some examples, second panel 14 includes a plurality of through-holes 38 arranged in one or more rows along the length of second panel 14. Additionally or alternatively, second panel 14 may include a plurality of through-holes 38 arranged in an array or other pattern, as desired for a given application. In the example shown in FIG. 2, second panel 14 includes a row of through-holes 38, spaced apart from one another and generally linearly arranged along the length of second panel 14, positioned within first edge region 62 of second panel 14. Generally, through-holes 38 may be formed in second panel 14 in areas where it is desired to join second panel 14 to another panel (e.g., to first panel 12). In the example of FIG. 2, first panel 12 is joined to second panel 14 along first edge region 60 of first panel 12 and first edge region 62 of second panel 14, and thus, clearance holes 40 and through-holes 38 (FIG. 1) are positioned accordingly. Through-holes 38 have a substantially constant diameter in some examples, and are countersunk in some examples, having a diameter that decreases between second outer surface 42 of second panel 14 and second inner surface 48.

Returning to FIG. 1, first panel 12 and second panel 14 are generally aligned and positioned with respect to one another such that each respective clearance hole 40 of first panel 12 aligns with a respective through-hole 38 of second panel 14, thereby forming a plurality of clearance hole-through-hole pairs 94 (e.g., systems 18 may include a respective through-hole 38 for each respective clearance hole 40). As shown in FIG. 1, panels 12, 14 may be arranged such that each respective clearance hole-through-hole pair 94 is substantially concentric with each other, but in some examples, respective through-holes 38 and clearance holes 40 of respective clearance hole-through-hole pairs 94 need not be concentric. Systems 18 generally include a respective sliding joint kit 10 for each clearance hole-through-hole pair 94, such that each sliding joint kit 10 may be assembled to join first panel 12 to second panel 14. A respective sliding joint kit 10 is configured to join first panel 12 to second panel 14 at a respective location within first edge region 60 of first panel 12 and first edge region 62 of second panel 14, such that first portion 52 of first inner surface 50 of first panel 12 is in sliding contact with first portion 54 of second inner surface 48 of second panel 14. First portion 52 of first inner surface 50 may be within first edge region 60 of first panel 12, and first portion 54 of second inner surface 48 may be within first edge region 62 of second panel 14, as best illustrated in FIG. 2. Thus, systems 18 are configured such that when sliding joint kits 10 of FIG. 1 are assembled to join first panel 12 and second panel 14, the sliding joint maintains contact between first portion 52 of first inner surface 50 of first panel 12 and first portion 54 of second inner surface 48 of second panel 14, while permitting sliding movement of first portion 54 of the second inner surface 48 with respect to first portion 52 of first inner surface 50. When assembled, through-hole 38 generally receives first head portion 36 of fastener 28. In some examples, an outer fastener surface 96 of first head portion 36 is substantially flush with second outer surface 42 of second panel 14, though in other examples, first head portion 36 may extend beyond second outer surface 42 of second panel 14.

Systems 18 may include any suitable number of sliding joints 16. As illustrative examples, systems 18 include at least 5, at least 10, at least 15, at least 20, at least 25, at least 30, at least 40, and/or at least 50 sliding joints 16 in some examples. In some examples, systems 18 include a plurality of sliding joints 16 sufficient to prevent and/or reduce vibration between first panel 12 and second panel 14 adjacent first edge region 60 of first panel 12 and first edge region 62 of second panel 14. Additionally or alternatively, systems 18 may include a plurality of sliding joints 16 sufficient to prevent and/or reduce entry of air into interior cavity 22 formed between first panel 12 and second panel 14. In some systems 18, respective sliding joints 16 may be positioned at locations of maximum deflection between first panel 12 and second panel 14.

Turning now to FIGS. 2-9, illustrative non-exclusive examples of systems 18 and sliding joints 16 are illustrated. Where appropriate, the reference numerals from the schematic illustrations of FIG. 1 are used to designate corresponding parts of FIGS. 2-9; however, the examples of FIGS. 2-9 are non-exclusive and do not limit systems 18 or sliding joints 16 to the illustrated embodiments of FIGS. 2-9. That is, systems 18 and sliding joints 16 are not limited to the specific embodiments of the illustrated FIGS. 2-9 and may incorporate any number of the various aspects, configurations, characteristics, properties, etc. that are illustrated in and discussed with reference to the schematic representations of FIG. 1 and/or the embodiments of FIGS. 2-9, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to FIGS. 2-9; however, it is within the scope of the present disclosure that the previously discussed features, variants, etc. may be utilized with any of the embodiments of FIGS. 2-9.

FIG. 2 illustrates a system 98, which is an example of system 18, in the form of a heat shield 24 for an aircraft. System 98 includes a first side panel 100 and a second side panel 100' (which are examples of first panel 12), and a bottom panel 102 (which is an example of second panel 14). Bottom panel 102 is joined to first and second side panels 100, 100' at either end of bottom panel 102 via a plurality of sliding joints 16. As shown in FIG. 2, bottom panel 102 includes first edge region 62 and a second edge region 62', opposite first edge region 62. First side panel 100 is joined to bottom panel 102 along first edge region 62 of bottom panel 102 and first edge region 60 of first side panel 100. Similarly, second side panel 100' is joined to bottom panel 102 along second edge region 62' of bottom panel 102 and first edge region 60' of second side panel 100'. Accordingly, system 98 includes a plurality of sliding joints 16 along first edge region 62 and second edge region 62' of bottom panel 102. A first portion 104 of the plurality of sliding joints 16 are positioned along first edge region 62 of bottom panel 102 and first edge region 60 of first side panel 100, thereby joining the same in sliding contact. A second portion 106 of the plurality of sliding joints 16 are positioned along second edge region 62' of bottom panel 102 and first edge region 60' of second side panel 100', thereby joining the same in sliding contact. First portion 104 and second portion 106 of sliding joints 16 may include any suitable number of sliding joints. For example, at least 5, at least 10, at least 15, at least 20, at least 25, at least 30, at least 40, and/or at least 50 sliding joints 16 may be positioned along each of first edge region 62 and second edge region 62' of bottom panel 102.

Side panels 100, 100' and bottom panel 102 of heat shield 24 are contoured, as shown in FIG. 2, and arranged with respect to one another to form interior cavity 22 bounded by the panels. In some systems 98, a plurality of internal frames 108 are positioned within interior cavity 22, and a respective sliding joint 16 may be positioned at or near each respective midpoint between respective pairs of adjacent internal frames 108. Additionally or alternatively, a respective sliding joint 16 may be positioned adjacent each endpoint 110, and spaced apart from one another between respective endpoints 110.

Figure 3:
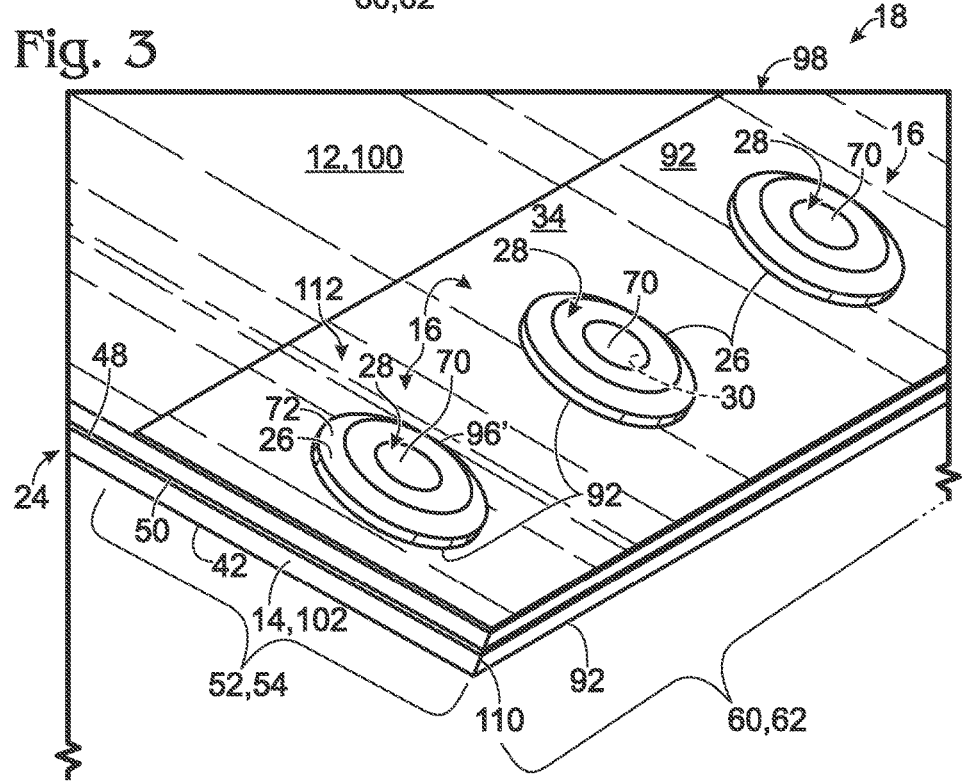
FIG. 3 is a perspective, close-up view of a portion of a first panel and a second panel joined together by a plurality of sliding joints according to the present disclosure.
Figure 4:
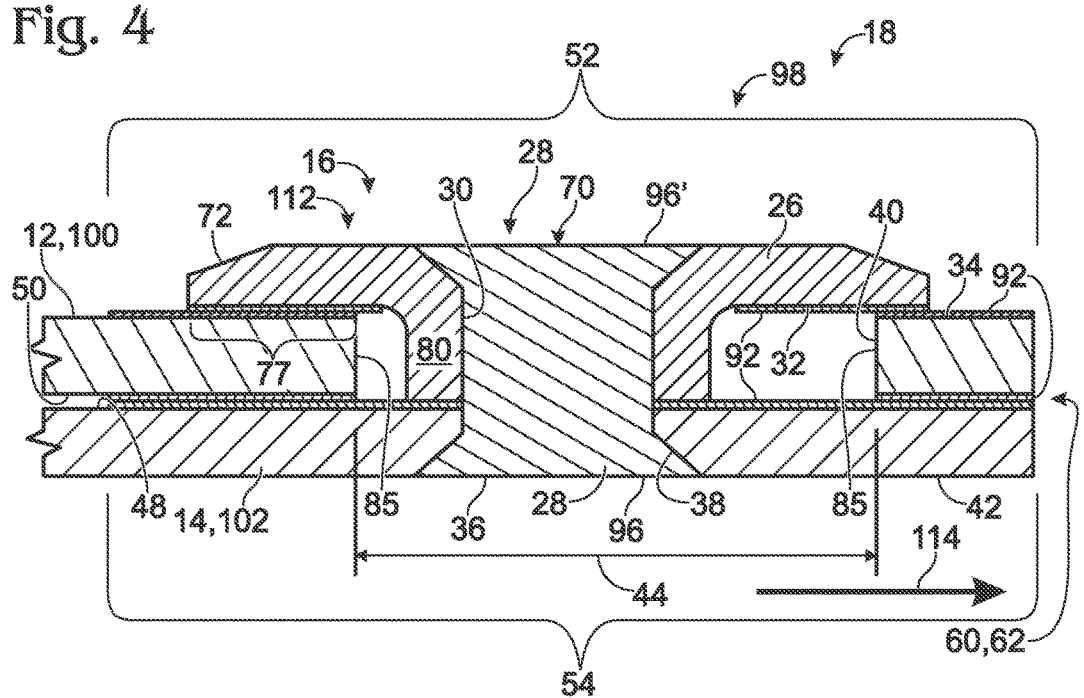
FIG. 4 is a cutaway view of one example of a sliding joint, joining a first panel and a second panel, according to the present disclosure.

FIG. 3 shows a close-up of one corner of heat shield 24 from FIG. 2 having a plurality of sliding joints 112 (which is an example of sliding joint 16), and FIG. 4 shows a cut-away view of one sliding joint 112 from FIG. 3. In the example shown in FIGS. 3-4, fastener 28 includes first head portion 36 engaged with bottom panel 102, and second head portion 70 engaged with washer 26. The example of fastener 28 shown is a double flush countersunk rivet (e.g., both central hole 30 in washer 26 and through-hole 38 in bottom panel 102 are countersunk such that first outer fastener surface 96 is flush with second outer surface 42 and second outer fastener surface 96' is flush with upper flange surface 72 of washer 26), but different types of fasteners may be included in other examples. System 98 also includes wear coating 92 on second inner surface 48 of bottom panel 102 (e.g., on first portion 54 of second inner surface 48), first inner surface 50 of side panel 100 (e.g., on first portion 52 of first inner surface 50), and lower flange surface 32 of washer 26. In some examples, first outer surface 34 of side panel 100 may additionally include wear coating 92, such as in areas of first outer surface 34 over which washer 26 slides when bottom panel 102 moves with respect to side panel 100. The thickness of wear coating 92 may be exaggerated in the figures, for illustration purposes.

Washer 26 of the example of FIGS. 3-4 (which is illustrated on its own in FIG. 5, for clarity) includes stem 80 having inner stem diameter 82 sized to receive fastener 28 and outer stem diameter 84. As best seen in FIG. 4, stem 80 is positioned within clearance hole 40 of side panel 100 when sliding joint 112 is assembled to join side panel 100 and bottom panel 102, as shown. Fastener 28 extends through central hole 30 of washer 26 (and stem 80). Clearance diameter 44 of clearance hole 40 is sized relative to outer stem diameter 84 such that stem 80 and fastener 28 may move within clearance hole 40 as bottom panel 102 moves with respect to side panel 100. In some examples, clearance hole 40 is sized to be large enough to accommodate anticipated movement of stem 80 due to expansion of bottom panel 102 such that stem 80 does not contact peripheral side wall 85 of clearance hole 40. Washer 26 and fastener 28 are substantially fixed with respect to bottom panel 102, such that as bottom panel 102 moves relative to side panel 100, fastener 28 and washer 26 move along with bottom panel 102.

FIG. 4 also illustrates first portion 52 of first inner surface 50 of side panel 100 and first portion 54 of second inner surface 48 of bottom panel 102 in sliding contact with one another. A second portion of side panel 100 (e.g., second portion 56 of first panel 12 in FIGS. 1-2) and a second portion of bottom panel 102 (e.g., second portion 58 of second panel 14 in FIGS. 1-2) may be spaced apart from one another, such as to form an interior cavity between the second portions of the panels (e.g., interior cavity 22 of FIGS. 1-2). For example, side panel 100 and bottom panel 102 may be contoured in system 98 such that they are in sliding contact with one another near first edge region 60 of side panel 100 and first edge region 62 of bottom panel 102. In other words, first portion 52 of side panel 100 may be positioned within first edge region 60 of side panel 100, and first portion 54 of bottom panel 102 may be positioned within first edge region 62 of bottom panel 102.

As shown in FIG. 4, which shows side panel 100 and bottom panel 102 in a nominal temperature condition, stem 80 (and/or fastener 28) need not be centered within clearance hole 40 of side panel 100, when sliding joint 112 is assembled, thereby joining the panels. In other examples, stem 80 (and/or fastener 28) may be centered within clearance hole 40 in the nominal temperature condition. In an elevated temperature condition, bottom panel 102 may expand relative to side panel 100, and thereby effectively move with respect to side panel 100. In some examples, bottom panel 102 moves in one or more directions relative to side panel 100, such as along arrow 114. Because fastener 28 and washer 26 are substantially fixed with respect to bottom panel 102, when bottom panel 102 moves with respect to side panel 100, fastener 28 and washer 26 also move with respect to side panel 100, within clearance hole 40 (and lower flange surface 32 of washer 26 moves along first outer surface 34 of side panel 100).

Figure 5:
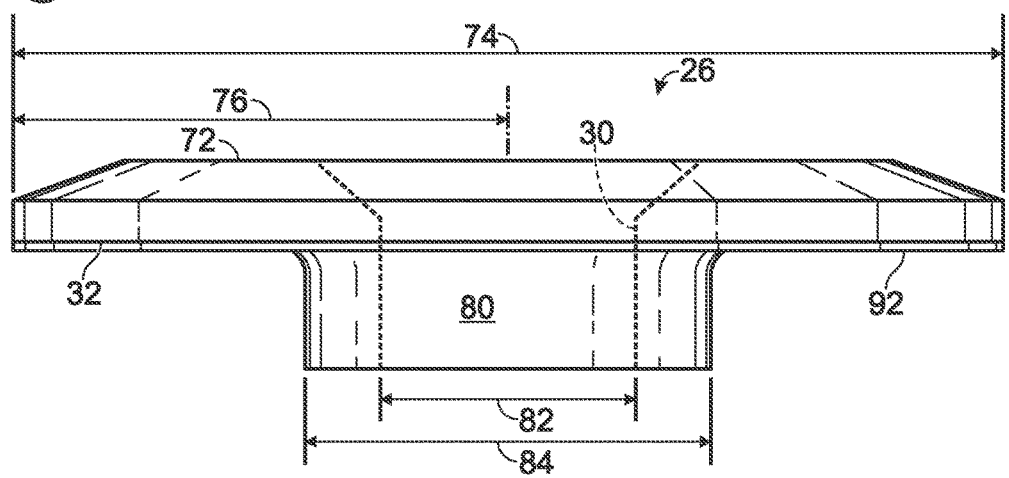
FIG. 5 is an elevation view of one example of a washer having a stem that may be a component of sliding joints according to the present disclosure.
Figure 6:
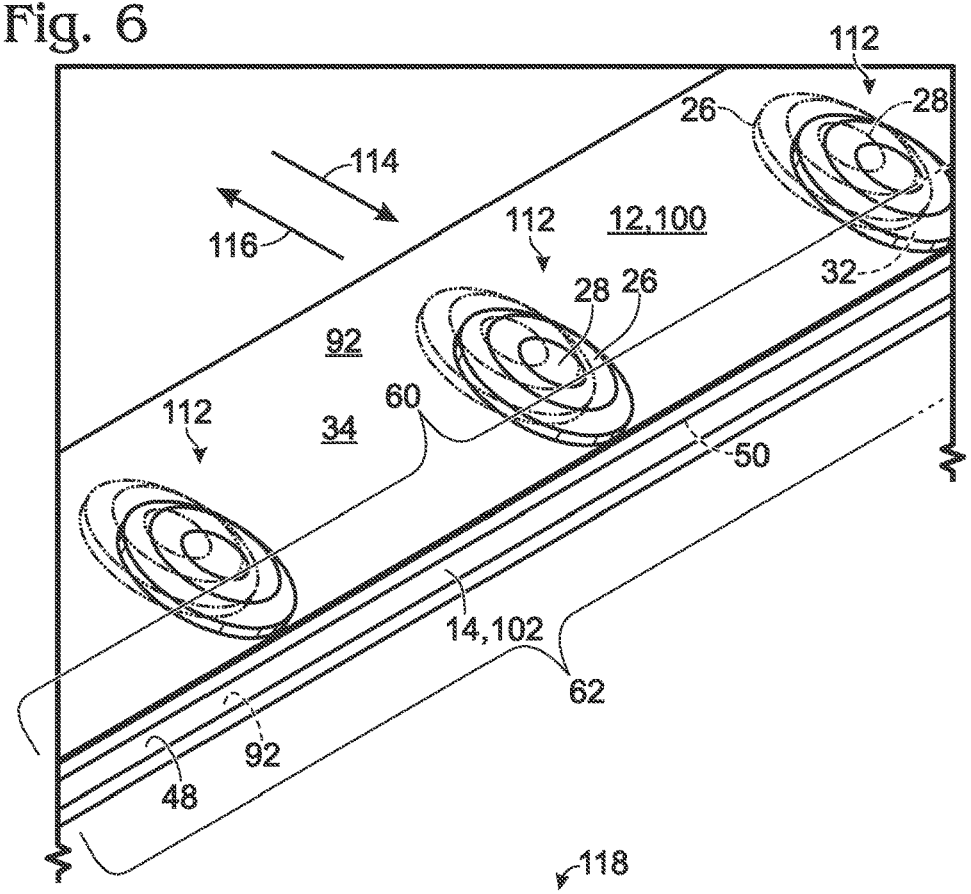
FIG. 6 is a perspective view of a portion of a first panel and a second panel joined by sliding joints according to the present disclosure, illustrating movement of the sliding joints and the second panel with respect to the first panel, due to thermal expansion.

FIG. 6 illustrates one example of such movement, with the position of washer 26 and fastener 28 in the nominal temperature condition shown in dashed lines. While first edge region 60 of side panel 100 and first edge region 62 of bottom panel 102 may be substantially coincident in the nominal temperature configuration, as shown in FIG. 5, in an elevated temperature condition, such as shown in FIG. 6, first edge region 60 of side panel 100 and first edge region 62 of bottom panel 102 are not coincident.

As shown in FIG. 6, side panel 100 and bottom panel 102 have been exposed to a temperature condition sufficient to cause thermal expansion of bottom panel 102 to a greater extent than side panel 100. Sliding joints 112 are configured to permit movement of one panel (e.g., bottom panel 102) with respect to another (e.g., side panel 100) due to unequal thermal expansion amongst the panels. In this example, bottom panel 102 has expanded and moved relative to side panel 100 (e.g., in the direction indicated by arrow 114), resulting in movement of washers 26 and fasteners 28 relative to side panel 100 from the positions shown in dashed line, to the positions shown in solid lines, and resulting in movement of bottom panel 102 relative to side panel 100 such that part of bottom panel 102 extends beyond side panel 100. For example, a part of first edge region 62 of bottom panel 102 extends beyond first edge region 60 of side panel 100 in this configuration, such that a portion of second inner surface 48 of bottom panel 102 may be exposed (which may or may not have a wear coating 92 present on it as well). As temperature conditions cool, bottom panel 102 may contract relative to side panel 100 such that second inner surface 48 of bottom panel 102 slides along and with respect to first inner surface 50 of side panel 100 (e.g., along arrow 116), and lower flange surface 32 of washer 26 slides along and with respect to first outer surface 34 of side panel 100. After heating and expanding, bottom panel 102 may cool and contract, thereby returning to the nominal temperature configuration shown in FIG. 4.

Figure 7:
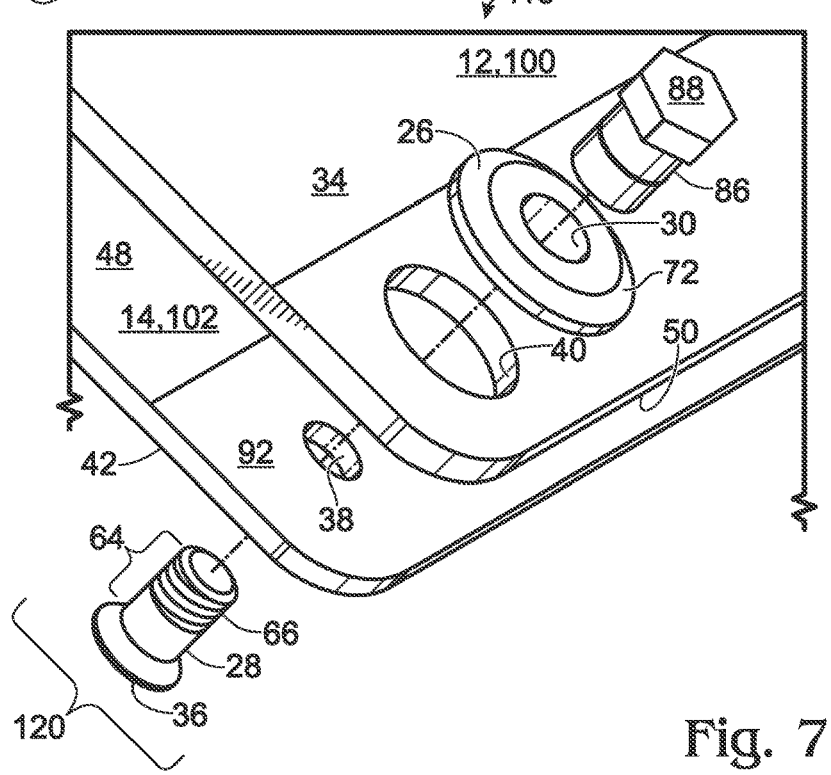
FIG. 7 is an exploded view of another example of a sliding joint according to the present disclosure.
Figure 8:
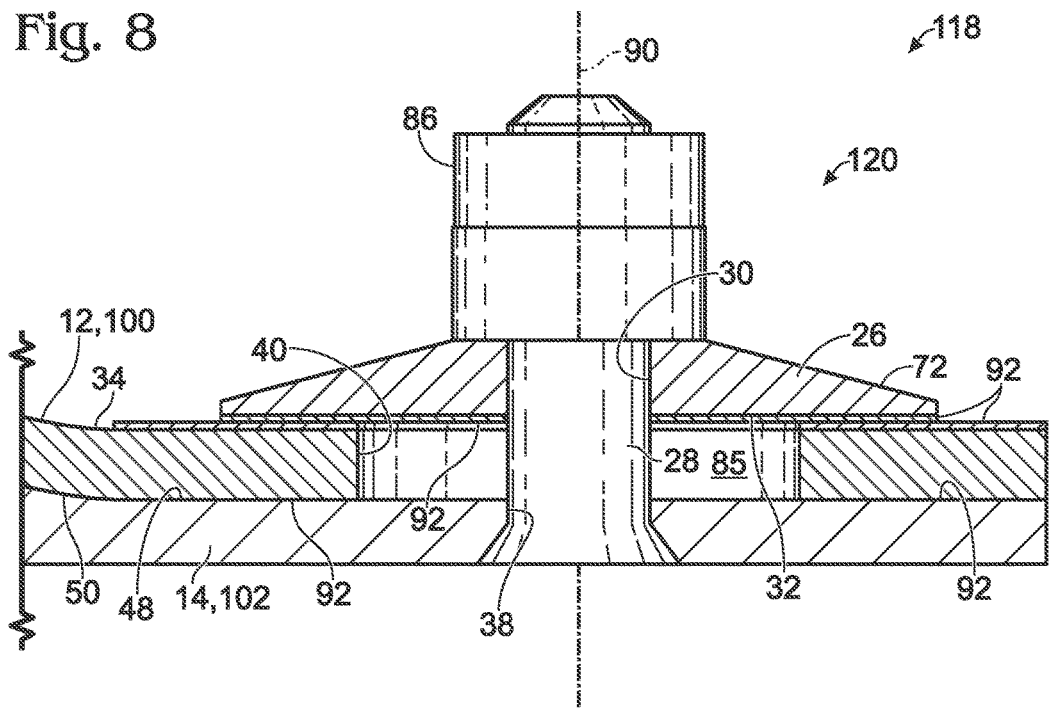
FIG. 8 is a cutaway view of the sliding joint of FIG. 7, assembled and joining two panels, according to the present disclosure.
Figure 9:
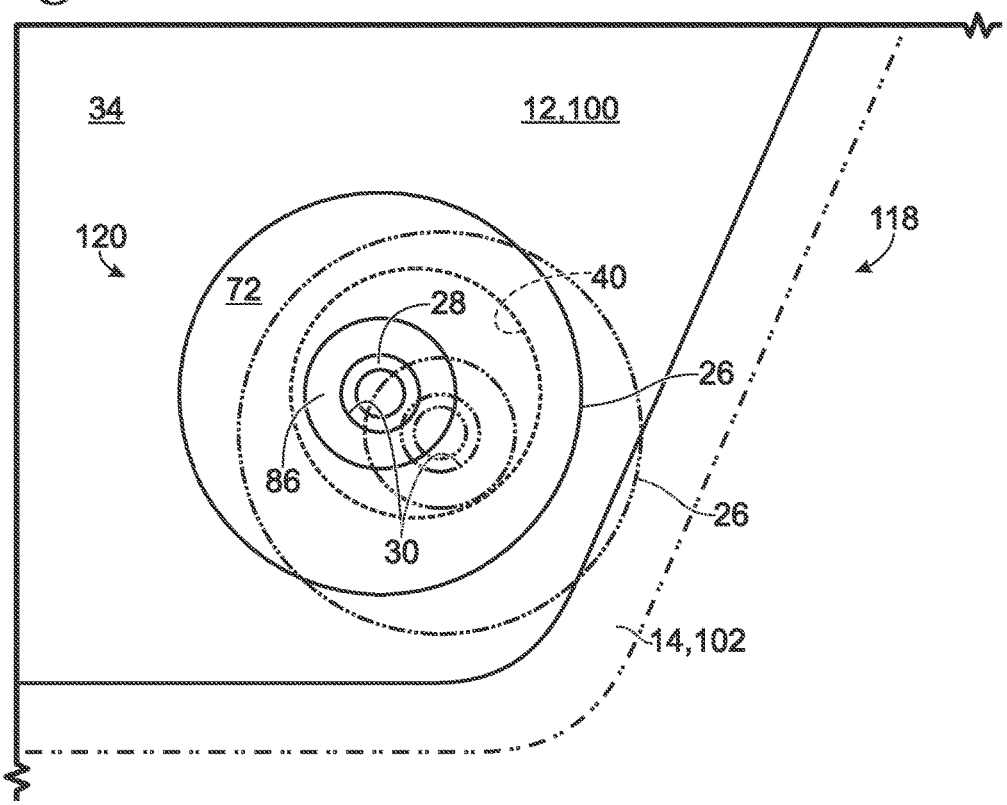
FIG. 9 is a plan view of a portion of a first panel and a second panel joined by a sliding joint according to the present disclosure, illustrating movement of the sliding joint with respect to the first panel, due to thermal expansion.

FIGS. 7-9 illustrate a system 118 (which is another example of system 18), which includes one or more sliding joints 120 (which are examples of sliding joint 16). FIG. 7 shows sliding joint 120 in an exploded view, FIG. 8 shows a partial cutaway view of sliding joint 120 assembled with respect to side panel 100 and bottom panel 102, and FIG. 9 shows movement of sliding joint 120 relative to side panel 100, resulting from thermal expansion of bottom panel 102 relative to side panel 100. In this example, fastener 28 is a bolt having first head portion 36 that engages with bottom panel 102, but fastener 28 does not include a second head portion in this example. Washer 26 also does not include a stem in this example. When sliding joint 120 is assembled to side panel 100 and bottom panel 102, fastener 28 is positioned through though-hole 38 in bottom panel 102, clearance hole 40 in side panel 100, central hole 30 of washer 26, and threaded collar 86. Shaft 64 of fastener 28 includes threaded portion 66 that is configured to engage with internal threads of threaded collar 86. Sliding joint 120 may also include wrenching element 88 which is initially coupled to threaded collar 86 (though shown separated from in FIG. 7), when sliding joint 120 is being assembled to the panels. Wrenching element 88 may be configured to engage with a wrench or other tool to tighten threaded collar 86 onto fastener 28. Once a predetermined torque is reached while tightening threaded collar 86 onto fastener 28, wrenching element 88 is configured to break off from threaded collar 86, leaving just threaded collar 86 coupled to shaft 64 of fastener 28. In this manner, wrenching element 88 may be configured to prevent threaded collar 86 from being tightened too much onto fastener 28. For example, if sliding joint 120 is tightened too far, friction and tensile loads between washer 26 and first outer surface 34 of side panel 100 (and/or between first inner surface 50 of side panel 100 and second inner surface 48 of bottom panel 102), may prevent the panels from sliding with respect to one another in the event of thermal expansion of one panel relative to another.

FIG. 8 shows sliding joint 120 assembled, thereby joining bottom panel 102 to side panel 100. As shown in FIG. 8, when sliding joint 120 is assembled, threaded collar 86 is configured to secure fastener 28 with respect to washer 26 and clearance hole 40, such that fastener 28 is substantially prevented from traveling in a longitudinal direction (e.g., along longitudinal axis 90) relative to side panel 100 and bottom panel 102. Wear coating 92 may be applied to (or deposited on, etc.) some or all of first inner surface 50 of side panel 100, second inner surface 48 of bottom panel 102, lower flange surface 32 of washer 26, and/or first outer surface 34 of side panel 100. As bottom panel 102 thermally expands and moves relative to side panel 100, fastener 28 moves within and with respect to clearance hole 40, and lower flange surface 32 of washer 26 slides along first outer surface 34 of side panel 100. FIG. 9 illustrates movement of washer 26, fastener 28, threaded collar 86, and bottom panel 102 with respect to clearance hole 40 and side panel 100 between a nominal temperature condition (shown in solid lines) and an elevated temperature condition (shown in dashed lines) sufficient to cause thermal expansion of bottom panel 102 relative to side panel 100.

FIG. 10 schematically provides a flowchart that represents illustrative, non-exclusive examples of methods 200, 202 according to the present disclosure. In FIG. 10, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 10 are not limiting and other methods and steps are within the scope of the present disclosure, including methods having greater than or fewer than the number of steps illustrated, as understood from the discussions herein.

Methods of joining one or more panels 200 (e.g., joining first panel 12 and second panel 14) are disclosed, and also may be methods of incorporating one or more presently disclosed systems 202, such as methods 202 of incorporating systems 18, 98, and/or 118 into one or more panels and/or into an aircraft. Methods 200, 202 generally include positioning a first panel and a second panel at 204, and fastening/assembling a sliding joint (e.g., sliding joint 16) at 206, such as by assembling and coupling one or more sliding joint kits (e.g., sliding joint kit 10) to join the first panel and the second panel, thereby joining the panels. Positioning the first panel and the second panel at 204 generally includes positioning a first portion of a first inner surface of the first panel (e.g., first portion 52 of first inner surface 50 of first panel 12) such that it is adjacent to and faces a first portion of a second inner surface of the second panel (e.g., first portion 54 of second inner surface 48 of second panel 14). As described above, the first portions of the first inner surface and second inner surface may include a plurality of clearance holes and through-holes formed therethrough, respectively. In some examples, methods 200 include drilling, milling, or otherwise forming one or more clearance holes (e.g., clearance hole 40) in the first panel (such as within first edge region 60 of first panel 12) and/or drilling, milling, or otherwise forming one or more through-holes (e.g., through hole 38) in the second panel (such as within first edge region 62 and/or second edge region 62' of second panel 14), at 208.

In some methods 200, positioning the first panel and the second panel at 204 includes aligning the first panel and the second panel with respect to each other such that each respective clearance hole forms a respective clearance hole-through-hole pair with a respective through-hole (e.g., the panels may be aligned and positioned with respect to one another such that respective holes formed in the respective panels are aligned with one another).

Fastening the sliding joint to the panels at 206 is performed to join the panels together such that at least a portion of the panels are in sliding contact with one another. In some methods 200, a single sliding joint may be fastened to join the panels. In some methods 200, a plurality of sliding joints may be fastened to join the panels together. In some examples, fastening the sliding joint(s) to the panels at 206 includes fastening a sufficient quantity of respective sliding joints such that vibration between the first and second panel is prevented or reduced. Additionally or alternatively, fastening the sliding joint(s) to the panels at 206 may include fastening a sufficient quantity of respective sliding joints such that entry of air into a cavity formed between the first panel and the second panel (e.g., interior cavity 22) is prevented or reduced. In some methods 200, fastening the sliding joint at 206 includes fastening a respective sliding joint at each respective midpoint between respective adjacent pairs of internal frames coupled to the first and/or second panel.

The panels may be joined such that the entire respective panels are in sliding contact with each other. Alternatively, the panels may be joined such that only a portion of the respective panels are in sliding contact with each other. Fastening the sliding joint and/or assembling the sliding joint kit at 206 generally includes fastening a respective sliding joint to each respective clearance hole-through-hole pair. In some methods, fastening the sliding joint to the panels at 206 includes inserting a fastener (e.g., fastener 28) at 210, positioning a washer (e.g., washer 26) at 212, engaging a first head portion of the fastener (e.g., first head portion 36) at 214, engaging a second head portion of the fastener (e.g., second head portion 70) at 216, and/or engaging a threaded collar (e.g., threaded collar 86) at 218.

Inserting the fastener at 210 generally includes inserting the fastener through the clearance hole in the first panel, through the through-hole in the second panel, and through the central hole in the washer (e.g., central hole 30 of washer 26). In some examples, inserting the fastener at 210 also includes inserting the fastener through a threaded collar, so as to engage the threaded collar with a threaded portion of the fastener at 218. In some methods 200, inserting the fastener at 210 includes inserting the fastener sufficiently so as to engage a first head portion (e.g., first head portion 36) of the fastener with the second panel at 214. In some examples, this includes engaging the fastener such that an outer fastener surface (e.g., outer fastener surface 96) is substantially flush with a second outer surface of the second panel (e.g., second outer surface 42 of second panel 14). Additionally or alternatively, in examples where the fastener includes a second head portion, the second head portion may be engaged at 216, such as in the case of a double countersunk rivet, where the second head portion may be engaged with the washer, such as with an upper flange surface of the washer (e.g., upper flange surface 72).

Positioning the washer at 212 generally includes positioning the washer such that a lower flange surface (e.g., lower flange surface 32) of the washer faces a first outer surface of the first panel (e.g., first outer surface 34 of first panel 12). In some methods, at least a portion of the lower flange surface may be in direct contact with the first outer surface of the first panel. In some methods, one or more layers of wear coating may be present, such as on the lower flange surface and/or on the first outer surface of the first panel.

Methods 200 include applying a wear coating (e.g., wear coating 92) at 220 in some examples. For example, a wear coating may be applied to (e.g., sprayed on, deposited on, adhered to, or otherwise applied to) one or more surfaces of the sliding joint and/or panels. In some methods 200, applying the wear coating at 220 includes applying the wear coating to at least a portion of one or more of the lower flange surface of the washer, the first outer surface of the first panel, the first inner surface of the first panel, and the second inner surface of the second panel. In some methods, applying the wear coating at 220 includes applying wear coating to any surfaces that are configured to be in sliding contact with another surface. Applying the wear coating at 220 may be performed prior to assembling the sliding joints at 206, prior to drilling the clearance hole(s) and/or through-hole(s) at 208, and/or prior to positioning the first and second panels at 204. Applying the wear coating at 220 includes applying the wear coating on the first portion of the second inner surface of the second panel, and on the first portion of the first inner surface of the first panel, in some examples.

Some methods 200 include exposing the first and second panels to heat at 222, such that the panels are in an elevated temperature condition. For example, in the case where the first and second panels form a part of a heat shield for an aircraft, exposing the panels to heat at 222 may include turning on the aircraft's engines and/or flying the aircraft. Exposing the panels to heat at 222 may include exposing the panels to a temperature sufficient to cause thermal expansion of the first panel and/or the second panel. Exposing presently disclosed systems to heat at 222 may result in thermal expansion of the second panel relative to the first panel, in which case the presently disclosed sliding joints are configured to advantageously allow movement of the second panel relative to the first panel, due to thermal expansion of the second panel relative to the first panel. In this manner, presently disclosed systems and sliding joints may be configured to prevent buckling or other damage to the second panel, reduce likelihood of crack initiation in the second panel, and/or reduce stress at the joints joining the panels.

Illustrative, non-exclusive examples of inventive subject matter according to the present disclosure are described in the following enumerated paragraphs:

A1. A sliding joint kit for joining a first panel to a second panel, the sliding joint kit comprising:

a washer having a central hole and a lower flange surface configured to slide with respect to the first panel, the washer being configured such that the lower flange surface faces a first outer surface of the first panel; and a fastener extending through the central hole of the washer, the fastener having a first head portion configured to engage the second panel;

wherein the sliding joint kit is configured to be assembled to join the first panel and the second panel, wherein when the first panel is joined to the second panel via the assembled sliding joint kit, the fastener and the washer are fixed with respect to the second panel, and wherein when the fastener and the washer are fixed with respect to the second panel, the washer and the second panel are in sliding contact with the first panel.

A1.1 The sliding joint kit of paragraph A1, wherein when the fastener and the washer are fixed with respect to the second panel, and the lower flange surface of the washer is in sliding contact with a first outer surface of the first panel.

A1.2. The sliding joint kit of paragraph A1 or A1.1, wherein when the fastener and the washer are fixed with respect to the second panel, a second inner surface of the second panel is in sliding contact with a first inner surface of the first panel.

A2. The sliding joint kit of paragraph A1, wherein the sliding joint kit is configured to accommodate different coefficients of thermal expansion between the second panel and the first panel.

A3. The sliding joint kit of any of paragraphs A1-A2, wherein when the fastener and the washer are fixed with respect to the second panel, the sliding joint kit is configured to maintain contact between a first portion of the first panel and a first portion of the second panel, while permitting sliding of the first portion of the second panel with respect to the first portion of the first panel.

A3.1. The sliding joint kit of paragraph A3, wherein the first portion of the first panel is within a first edge region of the first panel, and wherein the first portion of the second panel is within a first edge region of the second panel.

A4. The sliding joint kit of any of paragraphs A1-A3.1, wherein when the fastener and the washer are fixed with respect to the second panel, the first head portion is flush with a second outer surface of the second panel.

A4.1. The sliding joint kit of any of paragraphs A1-A4, wherein the first head portion is chamfered to engage a through-hole in the second panel, the through-hole being countersunk.

A5. The sliding joint kit of any of paragraphs A1-A4.1, wherein the fastener comprises a countersunk rivet.

A5.1. The sliding joint kit of any of paragraphs A1-A5, wherein the fastener comprises a double flush countersunk rivet.

A6. The sliding joint kit of any of paragraphs A1-A5, wherein the fastener comprises a second head portion configured to engage an upper flange surface of the washer, the upper flange surface being opposite the lower flange surface.

A7. The sliding joint kit of paragraph A6, wherein the second head portion of the fastener is flush with the upper flange surface of the washer.

A7.1. The sliding joint kit of any of paragraphs A6-A7, wherein the second head portion is chamfered to engage the central hole of the washer, the central hole being countersunk into the washer at the upper flange surface.

A8. The sliding joint kit of any of paragraphs A1-A7.1, wherein the fastener comprises a bolt having a shaft extending from the first head portion.

A9. The sliding joint kit of paragraph A8, wherein the shaft comprises a threaded portion.

A10. The sliding joint kit of any of paragraphs A8-A9, wherein the shaft has a shaft length sufficient to extend through the first panel, the second panel, and the washer.

A11. The sliding joint kit of any of paragraphs A1-A10, wherein a flange radius of the washer is greater than a diameter of a clearance hole formed in the first panel, wherein the fastener extends through the clearance hole when the fastener and the washer are fixed with respect to the second panel.

A12. The sliding joint kit of any of paragraphs A1-A11, wherein the sum of a/the flange radius of the washer and a fastener diameter of the fastener is greater than a/the diameter of a/the clearance hole formed in the first panel, though which the fastener is configured to extend.

A13. The sliding joint kit of any of paragraphs A1-A12, wherein a flange diameter of the washer is greater than a/the diameter of a/the clearance hole formed in the first panel, though which the fastener is configured to extend.

A14. The sliding joint kit of any of paragraphs A1-A13, wherein the washer comprises a stem extending from the lower flange surface, wherein the central hole extends through the stem, and wherein the fastener is configured to extend through the stem when the sliding joint kit is assembled to join the first panel and the second panel.

A15. The sliding joint kit of paragraph A14, wherein when the fastener and the washer are fixed with respect to the second panel, the stem of the washer is configured to slide within a/the clearance hole formed in the first panel as the second panel moves with respect to the first panel, and wherein the washer is configured to maintain an overlap between the lower flange surface and the first outer surface of the first panel.

A16. The sliding joint kit of paragraph A14 or A15, wherein when the fastener and the washer are fixed with respect to the second panel, the stem extends to a second inner surface of the second panel.

A16.1. The sliding joint kit of any of paragraphs A14-A16, wherein the stem has an inner stem diameter sized to accommodate the fastener, and wherein the stem has an outer stem diameter that is less than a/the diameter of a/the clearance hole formed in the first panel, though which the fastener is configured to extend.

A17. The sliding joint kit of any of paragraphs A1-A16.1, wherein when the fastener and the washer are fixed with respect to the second panel, the fastener extends through a/the through-hole in the second panel, wherein a second diameter of the through-hole is less than a/the diameter of a/the clearance hole formed in the first panel.

A18. The sliding joint kit of any of paragraphs A1-A17, further comprising a threaded collar having internal threads configured to engage a/the threaded portion of the fastener adjacent the washer.

A18.1. The sliding joint kit of paragraph A18, wherein the threaded collar is configured to have a maximum installation torque when the sliding joint kit is assembled to join the first panel and the second panel, and wherein the maximum installation torque is sufficiently low so as to allow sliding between the first panel and the second panel due to thermal expansion of the second panel with respect to the first panel.

A19. The sliding joint kit of paragraph A18 or A18.1, wherein the internal threads of the threaded collar are elliptical threads.

A20. The sliding joint kit of any of paragraphs A18-A19, wherein the threaded collar is configured to prevent movement of the fastener in a longitudinal direction with respect to the washer, the first panel, and the second panel when the sliding joint kit is assembled to join the first panel and the second panel, wherein the longitudinal direction is defined by the longitudinal axis of the fastener.

A21. The sliding joint kit of any of paragraphs A18-A20, wherein the threaded collar is configured to preload the fastener.

A22. The sliding joint kit of any of paragraphs A18-A21, wherein the threaded collar comprises a wrenching element that is configured to break away from the threaded collar at a predetermined preload.

A22.1. The sliding joint kit of paragraph A22, wherein the wrenching element comprises a hex head.

A22.2. The sliding joint kit of paragraph A22 or A22.1, wherein the threaded collar is substantially cylindrical.

A23. The sliding joint kit of any of paragraphs A1-A22.2, further comprising a coating on a/the second inner surface of the second panel, a first inner surface of the first panel, the first outer surface of the first panel, and/or the lower flange surface of the washer when the fastener and the washer are fixed with respect to the second panel.

A24. The sliding joint kit of paragraph A23, wherein the coating is configured to prevent wear.

A25. The sliding joint kit of paragraph A23 or A24, wherein the coating is configured to reduce friction between respective surfaces in contact with one another.

A26. The sliding joint kit of any of paragraphs A23-A25, wherein the coating comprises tungsten carbide.

A27. The sliding joint kit of any of paragraphs A1-A26, wherein the assembled sliding joint kit is configured to accommodate sliding of the second panel with respect to the first panel in a plurality of directions when the fastener and the washer are fixed with respect to the second panel.

A28. The sliding joint kit of any of paragraphs A1-A27, wherein the sliding joint kit is configured to join panels of an engine pylon fairing.

A29. The sliding joint kit of any of paragraphs A1-A28, wherein the sliding joint kit is configured for use on a heat shield for an aircraft.

A29.1. The sliding joint kit of any of paragraphs A1-A29, wherein the sliding joint kit is configured for use on a heat shield plume suppressor joint for an aircraft.

A30. The sliding joint kit of any of paragraphs A1-A29.1, wherein the sliding joint kit is configured for use with a jet propulsion system.

B1. A system, comprising:
a first panel having a first outer surface and a first inner surface opposite the first outer surface, wherein the first panel comprises a clearance hole extending through the first panel from the first outer surface to the first inner surface;
a second panel having a second outer surface and a second inner surface opposite the second outer surface, wherein the second panel comprises a through-hole extending through the second panel from the second outer surface to the second inner surface, wherein the second panel is arranged with respect to the first panel such that at least a first portion of the second inner surface faces a first portion of the first inner surface; and
a sliding joint assembled from the sliding joint kit of any of paragraphs A1-A30, wherein the sliding joint joins the first panel to the second panel at a respective location within a first edge region of the first panel and within a first edge region of the second panel such that the first portion of the second inner surface is in sliding contact with the first portion of the first panel, wherein the fastener is positioned such that it extends through the clearance hole, the through-hole, and the washer.

B2. The system of paragraph B1, wherein the first panel has a first coefficient of thermal expansion, wherein the second panel has a second coefficient of thermal expansion, and wherein the first coefficient of thermal expansion is different from the second coefficient of thermal expansion.

B3. The system of any of paragraphs B1-B2, wherein the clearance hole in the first panel has a first maximum diameter, wherein the through-hole in the second panel has a second maximum diameter, and wherein the first maximum diameter is greater than the second maximum diameter.

B3.1. The system of any of paragraphs B1-B3, wherein the clearance hole comprises a plurality of clearance holes, each respective clearance hole being spaced apart from one another and positioned within the first edge region of the first panel.

B3.2. The system of paragraph B3.1, wherein the through-hole comprises a plurality of through-holes, each respective through-hole being spaced apart from one another and positioned within the first edge region of the second panel, wherein the system comprises a respective through-hole for each respective clearance hole.

B3.3. The system of any of paragraphs B3-B3.2, wherein the first maximum diameter is greater than a fastener diameter of the fastener.

B3.4. The system of paragraph B3.3, wherein the first maximum diameter is sized relative to the fastener diameter such that the fastener remains spaced apart from a peripheral side wall of the clearance hole as the second panel thermally expands relative to the first panel.

B4. The system of any of paragraphs B1-B3.4, wherein the first portion of the first inner surface is within the first edge region of the first panel.

B5. The system of any of paragraphs B1-B4, wherein the first portion of the second inner surface is within the first edge region of the second panel.

B6. The system of any of paragraphs B1-B5, wherein the system is configured such that the sliding joint maintains contact between the first portion of the first inner surface and the first portion of the second inner surface, while permitting sliding movement of the first portion of the second inner surface with respect to the first portion of the first inner surface.

B7. The system of any of paragraphs B1-B6, wherein the second panel comprises a second heat shield panel.

B8. The system of any of paragraphs B1-B7, wherein the first panel comprises a first heat shield panel.

B8.1. The system of any of paragraphs B1-B8, wherein the first panel comprises a plume suppression flange for a/the heat shield.

B9. The system of any of paragraphs B1-B8.1, wherein the system is a heat shield for an aircraft.

B10. The system of any of paragraphs B1-B9, wherein the system is a heat shield plume suppressor for an aircraft.

B11. The system of any of paragraphs B1-B10, wherein the system is a component of a jet propulsion system.

B12. The system of any of paragraphs B1-B11, wherein the sliding joint comprises a plurality of sliding joints.

B12.1. The system of paragraph B12, wherein the plurality of sliding joints comprises a quantity of sliding joints configured to prevent and/or reduce vibration between the first panel and the second panel adjacent the first edge region of the first panel and the first edge region of the second panel.

B12.2. The system of any of paragraphs B12-B12.1, wherein the plurality of sliding joints comprises a quantity of sliding joints configured to prevent and/or reduce entry of air into a/the cavity formed between the first panel and the second panel.

B12.3. The system of any of paragraphs B12-B12.2, wherein each respective sliding joint of the plurality of sliding joints is respectively placed at locations of maximum deflection between the first panel and the second panel.

B13. The system of any of paragraphs B1-B12.3, wherein the second panel is a bottom panel of the system.

B14. The system of paragraph B13, wherein the bottom panel further comprises a second edge region of the bottom panel, the second edge region of the bottom panel being opposite the first edge region of the bottom panel.

B15. The system of any of paragraphs B1-B14, wherein the first panel comprises a side panel of the system.

B16. The system of paragraph B15, wherein the side panel comprises a first side panel and a second side panel.

B17. The system of paragraphs B14 and B16, wherein a first portion of a/the plurality of sliding joints is positioned along the first edge region of the first side panel and the first edge region of the bottom panel, thereby joining the first edge region of the first side panel in sliding contact with the first edge region of the bottom panel.

B18. The system of paragraph B17, wherein a second portion of the plurality of sliding joints are positioned along the first edge region of the second side panel and the second edge region of the bottom panel, thereby joining the first edge region of the second side panel in sliding contact with the second edge region of the bottom panel.

B18.1. The system of any of paragraphs B17-B18, wherein the first side panel, the second side panel, and the bottom panel are arranged with respect to one another to form a/the cavity bounded by the first side panel, the second side panel, and the bottom panel.

B18.2. The system of any of paragraphs B17-B18.1, wherein the first portion of the plurality of sliding joints comprises at least 5, at least 10, at least 15, at least 20, at least 25, at least 30, at least 40, and/or at least 50 sliding joints.

B18.3. The system of any of paragraphs B18-B18.2, wherein the second portion of the plurality of sliding joints comprises at least 5, at least 10, at least 15, at least 20, at least 25, at least 30, at least 40, and/or at least 50 sliding joints.

B18.4. The system of any of paragraphs B1-B18.3, wherein the system comprises a plurality of internal frames and wherein the system comprises a respective sliding joint of a/the plurality of sliding joints positioned at or near a respective midpoint between each respective pair of adjacent internal frames.

B19. The system of any of paragraphs B1-B18.4, wherein the first edge region of the first panel extends from a first end to a second end.

B20. The system of paragraph B19, wherein a/the plurality of sliding joints are positioned such that they are spaced apart from one another between the first end of the first panel and the second end of the first panel.

B21. The system of paragraph B19 or B20, wherein a first respective sliding joint of a/the plurality of sliding joints is positioned adjacent the first end of the first panel.

B22. The system of paragraph B21, wherein a second respective sliding joint of the plurality of sliding joints is positioned adjacent the second end of the first panel.

B23. The system of any of paragraphs B1-B22, wherein the clearance hole has a substantially constant diameter.

B24. The system of any of paragraphs B1-B23, wherein the through-hole is countersunk such that the diameter of the through-hole decreases between the second outer surface and the second inner surface of the second panel.

B25. The system of any of paragraphs B1-B24, wherein the through-hole is configured to receive the first head portion of the fastener such that an outer fastener surface of the first head portion is substantially flush with the second outer surface of the second panel.

B26. The system of any of paragraphs B1-B25, wherein the sliding joint is substantially fixed with respect to the second panel, such that the sliding joint is substantially stationary with respect to the second panel, as the second panel moves with respect to the first panel.

B26.1. The system of any of paragraphs B1-B26, wherein the fastener and the washer of the sliding joint are substantially fixed with respect to the second panel, such that the fastener and the washer are substantially stationary with respect to the second panel, as the second panel moves with respect to the first panel.

B27. The system of any of paragraphs B1-B26.1, wherein the second panel and the sliding joint move with respect to the first panel as the second panel moves with respect to the first panel.

B28. The system of any of paragraphs B1-B27, wherein the second panel and the sliding joint move with respect to the first panel as the second panel thermally expands with respect to the first panel.

B29. The system of any of paragraphs B1-B28, wherein the system is configured such that thermal expansion of the second panel relative to the first panel does not cause shear loading on the first panel.

B30. The system of any of paragraphs B1-B29, wherein the sum of a/the flange radius of the washer and a fastener diameter of the fastener is greater than a/the diameter of the clearance hole formed in the first panel, though which the fastener extends.

B30.1. The system of any of paragraphs B1-B30, wherein the sum of a/the flange radius of the washer and a/the outer stem diameter of a/the stem of the washer of the sliding joint is greater than a/the diameter of the clearance hole formed in the first panel, though which the stem extends.

B31. The system of any of paragraphs B1-B30.1, wherein a/the diameter of the clearance hole formed in the first panel is greater than a/the flange radius of the washer.

B32. The system of any of paragraphs B1-B31, wherein a/the diameter of the clearance hole formed in the first panel is more than 25% greater than a/the fastener diameter of the fastener, more than 50% greater than the fastener diameter, more than 75% greater than the fastener diameter, more than 100% greater than the fastener diameter, more than 150% greater than the fastener diameter, more than 200% greater than the fastener diameter, more than 250% greater than the fastener diameter, more than 300% greater than the fastener diameter, more than 400% greater than the fastener diameter, and/or more than 500% greater than the fastener diameter.

B32.1. The system of any of paragraphs B1-B32, wherein a/the diameter of the clearance hole formed in the first panel is more than 25% greater than a/the outer stem diameter of a/the stem of the washer of the sliding joint, more than 50% greater than the outer stem diameter, more than 75% greater than the outer stem diameter, more than 100% greater than the outer stem diameter, more than 150% greater than the outer stem diameter, more than 200% greater than the outer stem diameter, more than 250% greater than the outer stem diameter, more than 300% greater than the outer stem diameter, more than 400% greater than the outer stem diameter, and/or more than 500% greater than the outer stem diameter.

B33. The system of any of paragraphs B1-B32.1, further comprising a coating on a/the second inner surface of the second panel, a first inner surface of the first panel, the first outer surface of the first panel, and/or the lower flange surface of the washer of the sliding joint.

B34. The system of paragraph B33, wherein the coating is positioned on the first portion of the second inner surface of the second panel and on the first portion of the first inner surface of the first panel.

B35. The system of paragraph B33 or B34, wherein the coating is configured to prevent wear.

B36. The system of any of paragraphs B33-B35, wherein the coating is configured to reduce friction between respective surfaces in contact with one another.

B37. The system of any of paragraphs B33-B36, wherein the coating comprises tungsten carbide.

B38. The system of any of paragraphs B1-B37, wherein a/the diameter of the clearance hole is sized with respect to the fastener of the sliding joint to allow for a predetermined amount of thermal expansion of the second panel relative to the first panel.

B38.1. The system of any of paragraphs B1-B38, wherein a/the diameter of the clearance hole is sized with respect to a/the stem of the washer of the sliding joint to allow for a predetermined amount of thermal expansion of the second panel relative to the first panel.

B39. The system of any of paragraphs B1-B38.1, wherein, in a nominal temperature condition, the first edge region of the first panel and the first edge region of the second panel are substantially coincident with one another.

B40. The system of any of paragraphs B1-B39, wherein, in an elevated temperature condition having a temperature sufficient to cause thermal expansion of the second panel relative to the first panel, the first edge region of the second panel is non-coincident with the first edge region of the first panel.

B41. The system of any of paragraphs B1-B40, wherein the first panel and the second panel are contoured.

C1. An aircraft comprising the sliding joint kit of any of paragraphs A1-A30, wherein the sliding joint kit is assembled to join the first panel to the second panel, and wherein the first panel and the second panel are positioned within and/or form a part of the aircraft.

C2. The aircraft of paragraph C1, wherein the aircraft comprises the system of any of paragraphs B1-B41.

D1. A method of joining a first panel to a second panel, the method comprising:

positioning a first portion of a first inner surface of the first panel such that it faces and is adjacent to a first portion of a second inner surface of the second panel, wherein the first portion of the first inner surface comprises a plurality of clearance holes therethrough, and wherein the first portion of the second inner surface comprises a plurality of through-holes therethrough, wherein the second panel comprises a respective through-hole for each respective clearance hole of the first panel, and wherein the first panel and the second panel are aligned with respect to one another such that each respective clearance hole and through-hole form a respective clearance hole-through-hole pair; and fastening a sliding joint at a respective clearance hole-through-hole pair, thereby joining the first panel to the second panel, wherein the fastening the sliding joint comprises assembling the sliding joint kit of any of paragraphs A1-A30 with respect to the first panel and the second panel.

D1.1. The method of paragraph D1, wherein the fastening the sliding joint comprises fastening a plurality of sliding joints wherein the fastening the plurality of sliding joints comprises fastening a respective sliding joint of the plurality of sliding joints at each respective clearance hole-through-hole pair.

D2. The method of paragraph D1 or D1.1, wherein the fastening the sliding joint comprises positioning the washer of the sliding joint such that the lower flange surface faces a first outer surface of the first panel, the first outer surface being opposite the first inner surface of the first panel.

D3. The method of any of paragraphs D1-D2, wherein the fastening the sliding joint comprises inserting the fastener through the clearance hole, the through-hole, and the central hole of the washer.

D4. The method of any of paragraphs D1-D3, wherein the fastening the sliding joint comprises engaging the first head portion of the fastener with the second panel such that an outer fastener surface of the first head portion is substantially flush with a second outer surface of the second panel, the second outer surface being opposite the second inner surface of the second panel.

D5. The method of any of paragraphs D1-D4, wherein the fastening the sliding joint comprises fastening a sufficient quantity of respective sliding joints such that vibration between the first panel and the second panel is prevented or reduced.

D6. The method of any of paragraphs D1-D5, wherein the fastening the sliding joint comprises fastening a sufficient quantity of respective sliding joints such that entry of air into a cavity formed between the first panel and the second panel is prevented or reduced.

D7. The method of any of paragraphs D1-D6, wherein the fastening the sliding joint comprises fastening a respective sliding joint at each respective midpoint between each respective pair of adjacent internal frames coupled to the first panel and the second panel.

D8. The method of any of paragraphs D1-D7, wherein the first panel is a first side panel of a heat shield for an aircraft, wherein the second panel is a bottom panel of the heat shield, and wherein the method further comprises joining a second side panel to the bottom panel using a plurality of sliding joints.

D8.1. The method of any of paragraphs D1-D8, wherein the first panel is a first side panel of a plume suppression flange, wherein the second panel is a bottom panel of a plume suppression flange, and wherein the method further comprises joining a second side panel to the bottom panel using a plurality of sliding joints.

D9. The method of any of paragraphs D1-D8.1, further comprising exposing the first panel and the second panel to heat such that the second panel thermally expands relative to the first panel.

D10. The method of any of paragraphs D1-D9, further comprising drilling the plurality of clearance holes in the first panel.

D11. The method of any of paragraphs D1-D10, further comprising drilling the plurality of through-holes in the second panel.

D12. The method of any of paragraphs D1-D7, further comprising applying a wear coating on the second inner surface of the second panel, the first inner surface of the first panel, the first outer surface of the first panel, and/or a/the lower flange surface of the washer of the sliding joint.

D13. The method of paragraph D12, comprising applying the wear coating on the first portion of the second inner surface of the second panel and on the first portion of the first inner surface of the first panel.

D14. The method of paragraph D12 or D13, wherein the wear coating is configured to prevent wear.

D15. The method of any of paragraphs D12-D14, wherein the wear coating is configured to reduce friction between respective surfaces in contact with one another.

D16. The method of any of paragraphs D12-D15, wherein the wear coating comprises tungsten carbide.

E1. A method of preventing buckling in a flume suppression flange of an aircraft, comprising:

incorporating the system of any of paragraphs B1-B41 in the aircraft, thereby allowing thermal expansion of a bottom panel of the flume suppression flange with respect to a first side panel and a second side panel of the flume suppression flange.

E2. The method of paragraph E1, further comprising any of the method steps of paragraphs D1-D16.

F1. Use of the sliding joint kit of any of paragraphs A1-A30 to join a first panel to a second panel such that a first portion of the first panel is in sliding contact with a second portion of the second panel.

G1. Use of the sliding joint kit of any of paragraphs A1-A30 to prevent buckling in a flume suppression flange of an aircraft.

H1. Use of the system of any of paragraphs B1-B41 to prevent buckling in a flume suppression flange of an aircraft.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A sliding joint kit for joining a first panel to a second panel, the sliding joint kit comprising:
   a washer having a central hole and a lower flange surface configured to slide with respect to the first panel, the washer being configured such that the lower flange surface faces a first outer surface of the first panel; and
   a fastener extending through the central hole of the washer, the fastener having a first head portion configured to engage the second panel;
   wherein the sliding joint kit is configured to be assembled to join the first panel to the second panel, wherein when the first panel is joined to the second panel via the assembled sliding joint kit, the fastener and the washer are configured to be fixed with respect to the second panel, wherein when the fastener and the washer are fixed with respect to the second panel, the washer and the second panel are in sliding contact with the first panel such that the washer and the second panel are configured to move together with respect to the first panel in response to thermal expansion of the second panel relative to the first panel, wherein when the sliding joint kit is assembled to join the first panel and the second panel, the sliding joint kit maintains contact between a first portion of the first panel and a first portion of the second panel while permitting sliding movement of the first portion of the second panel and the washer with respect to the first portion of the first panel, and wherein the sliding joint kit is configured to accommodate different coefficients of thermal expansion between the second panel and the first panel.

2. The sliding joint kit according to claim 1, wherein the first portion of the first panel is within a first edge region of the first panel, and wherein the first portion of the second panel is within a first edge region of the second panel.

3. The sliding joint kit according to claim 1, wherein the fastener comprises a countersunk rivet, wherein when the sliding joint kit is assembled to join the first panel and the second panel, the first head portion is configured to be flush with a second outer surface of the second panel, wherein the countersunk rivet comprises a second head portion configured to engage an upper flange surface of the washer, the upper flange surface being opposite the lower flange surface.

4. The sliding joint kit according to claim 3, wherein the washer comprises a stem extending from the lower flange surface, wherein the central hole and the fastener extend through the stem, and wherein when the sliding joint kit is assembled to join the first panel and the second panel, the stem extends to a second inner surface of the second panel.

5. The sliding joint kit according to claim 4, wherein when the sliding joint kit is assembled to join the first panel and the second panel, the stem of the washer is configured to slide within a clearance hole formed in the first panel as the second panel moves with respect to the first panel, and wherein the washer is configured to maintain an overlap between the lower flange surface and the first outer surface of the first panel.

6. The sliding joint kit according to claim 1, further comprising a threaded collar having internal threads configured to engage the fastener adjacent the washer, wherein the fastener comprises a bolt having a shaft extending from the first head portion, wherein the shaft comprises a threaded portion with which the internal threads of the threaded collar are configured to engage, wherein the threaded collar is configured to have a maximum installation torque when the sliding joint kit is assembled to join the first panel and the second panel, and wherein the maximum installation torque is sufficiently low so as to allow sliding between the first panel and the second panel due to thermal expansion of the second panel with respect to the first panel.

7. The sliding joint kit according to claim 6, wherein the threaded collar is configured to prevent movement of the fastener in a longitudinal direction with respect to the washer, the first panel, and the second panel when the sliding joint kit is assembled to join the first panel and the second panel, wherein the longitudinal direction is defined by the longitudinal axis of the fastener.

8. A system, comprising:
   a first panel having a first outer surface and a first inner surface opposite the first outer surface, wherein the first panel comprises a clearance hole extending through the first panel from the first outer surface to the first inner surface;
   a second panel having a second outer surface and a second inner surface opposite the second outer surface, wherein the second panel comprises a through-hole extending through the second panel from the second outer surface to the second inner surface, wherein the second panel is arranged with respect to the first panel such that at least a first portion of the second inner surface faces a first portion of the first inner surface; and a plurality of sliding joints each assembled from a respective sliding joint kit according to claim 1, wherein the sliding joint joins the first panel to the second panel at a respective location within a first edge region of the first panel and within a first edge region of the second panel such that the first edge region of the second panel is in sliding contact with the first edge region of the first panel, wherein the fastener is positioned such that the fastener extends through the clearance hole, the through-hole, and the washer.

9. The system according to claim 8, wherein the first panel has a first coefficient of thermal expansion, wherein the second panel has a second coefficient of thermal expansion, and wherein the first coefficient of thermal expansion is lower than the second coefficient of thermal expansion.

10. The system according to claim 8, wherein the clearance hole comprises a plurality of clearance holes, each respective clearance hole being spaced apart from one another and positioned within the first edge region of the first panel, wherein the through-hole comprises a plurality of through-holes, each respective through-hole being spaced apart from one another and positioned within the first edge region of the second panel, and wherein the system comprises a respective through-hole for each respective clearance hole.

11. The system according to claim 8, wherein the second panel is a bottom panel for a heat shield for an aircraft, wherein the first panel is a first side panel for the heat shield, wherein the system further comprises a second side panel having a first edge region of the second side panel, wherein the bottom panel further comprises a second edge region of the bottom panel, the second edge region of the bottom panel being opposite the first edge region of the bottom panel, wherein a first portion of the plurality of sliding joints are positioned along the first edge region of the first side panel and the first edge region of the bottom panel, thereby joining the first edge region of the first side panel in sliding contact with the first edge region of the bottom panel, and wherein a second portion of the plurality of sliding joints are positioned along the first edge region of the second side panel and the second edge region of the bottom panel, thereby joining the first edge region of the second side panel in sliding contact with the second edge region of the bottom panel.

12. The system according to claim 8, wherein each sliding joint of the plurality of sliding joints is substantially fixed with respect to the second panel, such that each sliding joint is substantially stationary with respect to the second panel, as the second panel thermally expands with respect to the first panel.

13. The system according to claim 8, wherein the clearance hole in the first panel has a first maximum diameter, wherein the through-hole in the second panel has a second maximum diameter, wherein the first maximum diameter is greater than the second maximum diameter, wherein the first maximum diameter of the clearance hole formed in the first panel is greater than a fastener diameter of the fastener, and wherein the first maximum diameter is sized relative to the fastener diameter such that the fastener remains spaced apart from a peripheral side wall of the clearance hole as the second panel thermally expands relative to the first panel.

14. The system according to claim 8, further comprising a wear coating on the first portion of the second inner surface of the second panel, on the first portion of the first inner surface of the first panel, and on the lower flange surface of the washer.

15. An aircraft, comprising: the first panel, the second panel, and the plurality of sliding joints of the system of claim 8.

16. A method of joining a first panel to a second panel, the method comprising:
positioning a first portion of a first inner surface of the first panel such that it faces and is adjacent to a first portion of a second inner surface of the second panel, wherein the first portion of the first inner surface comprises a plurality of clearance holes there through, and wherein the first portion of the second inner surface comprises a plurality of through-holes there through, wherein the second panel comprises a respective through-hole for each respective clearance hole of the first panel, and wherein the first panel and the second panel are aligned with respect to one another such that each respective clearance hole and through-hole form a respective clearance hole-through-hole pair; and
fastening a sliding joint at a respective clearance hole-through-hole pair, thereby joining the first panel to the second panel, wherein the fastening the sliding joint comprises assembling the sliding joint kit according to claim 1 with respect to the first panel and the second panel.

17. The method according to claim 16, wherein the fastening the sliding joint comprises fastening a plurality of sliding joints, wherein the fastening the plurality of sliding joints comprises fastening a respective sliding joint of the plurality of sliding joints at each respective clearance hole-through-hole pair.

18. The method according to claim 16, wherein the first panel is a first side panel of a heat shield for an aircraft, wherein the second panel is a bottom panel of the heat shield, and wherein the method further comprises joining a second side panel to the bottom panel using a plurality of sliding joints.

19. The method according to claim 16, further comprising applying a wear coating on the first portion of the second inner surface of the second panel, on the first portion of the first inner surface of the first panel, and on the lower flange surface of the washer.

20. The sliding joint kit according to claim 1, wherein the sliding joint kit maintains direct contact between a first portion of the first panel and a first portion of the second panel while permitting sliding movement of the first portion of the second panel and the washer with respect to the first portion of the first panel.

21. The aircraft according to claim 15, wherein the fastener and the washer of each respective sliding joint of the plurality of sliding joints are fixed with respect to the second panel such that each respective washer and the second panel are in sliding contact with the first panel such that the sliding joint kit accommodates different coefficients of thermal expansion by permitting sliding movement of the first portion of the second panel and each respective washer with respect to the first portion of the first panel, and such that the first portion of the first panel remains substantially stationary with respect to the aircraft.

* * * * *